US012720569B2

(12) United States Patent

Zhang et al.

(10) Patent No.: US 12,720,569 B2

(45) Date of Patent: Aug. 25, 2026

(54) TECHNIQUES FOR INDICATING TIME AND FREQUENCY LOCATIONS OF SUB-BAND FULL-DUPLEX SUB-BANDS

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/523,456

(22) Filed: Nov. 29, 2023

(65) Prior Publication Data

US 2025/0175995 A1 May 29, 2025

(51) Int. Cl.

*H04W 72/04* (2023.01)

*H04L 5/14* (2006.01)

(Continued)

(52) U.S. Cl.

CPC ............. *H04W 72/232* (2023.01); *H04L 5/14* (2013.01); *H04W 16/28* (2013.01); *H04W 72/0446* (2013.01); *H04W 72/0453* (2013.01)

(58) Field of Classification Search

CPC ............... H04W 72/232; H04W 16/28; H04W 72/0446; H04W 72/0453; H04L 5/14; H04L 5/0078; H04L 5/0007; H04L 5/0092

See application file for complete search history.

(56) References Cited

U.S. PATENT DOCUMENTS

2023/0275736 A1 8/2023 Abdelghaffar et al.
2024/0196241 A1 * 6/2024 Rudolf .................. H04W 24/08
2025/0227708 A1 * 7/2025 Lu ......................... H04W 72/21

FOREIGN PATENT DOCUMENTS

WO WO-2023211352 A1 11/2023
WO WO-2023250244 A1 12/2023
(Continued)

OTHER PUBLICATIONS

Qualcomm (Feasibility and techniques for Subband non-overlapping full duplex•, 3GPP Draft; RI-2301411; Feb. 17, 2023).*
(Continued)

*Primary Examiner* — Lakeram Jangbahadur

(74) *Attorney, Agent, or Firm* — QUALCOMM Incorporated

(57) ABSTRACT

Methods, systems, and devices for wireless communications are described. In some cases, a user equipment (UE) may receive first configuration information that indicates a transmission direction pattern for multiple transmission time intervals (e.g., multiple symbols or multiple slots), wherein the transmission direction pattern defines, for the multiple transmission time intervals, one or more downlink transmission time intervals, one or more flexible transmission time intervals, or combinations thereof. Additionally, the UE may receive second control information that indicates one or more sub-band full-duplex (SBFD) patterns, the one or more SBFD patterns including an SBFD slot pattern indicating a symbol-level configuration of SBFD symbols within a slot, an SBFD window pattern indicating a window duration including SBFD symbols or SBFD slots, an SBFD frequency pattern indicating frequency resources associated with SBFD slots, or any combination thereof.

25 Claims, 15 Drawing Sheets

(51) Int. Cl.

| | |
|---|---|
| ***H04W 16/28*** | (2009.01) |
| ***H04W 72/0446*** | (2023.01) |
| ***H04W 72/0453*** | (2023.01) |
| ***H04W 72/232*** | (2023.01) |

(56) References Cited

FOREIGN PATENT DOCUMENTS

WO WO-2024173064 A1 8/2024
WO WO-2025034644 A1 * 2/2025 ............ H04W 72/04

OTHER PUBLICATIONS

International Search Report and Written Opinion—PCT/US2024/054251—ISA/EPO—Feb. 13, 2025.
Qualcomm Incorporated: "Feasibility and Techniques for Subband Non-Overlapping Full Duplex", 3GPP TSG RAN WG1, Meeting #111, R1- 2301411, Type_Discussion, FS_NR_Duplex_EVO, 3rd Generation Partnership Project (3GPP), Mobile Competence Centre, 650, Route Des Lucioles, F-06921 Sophia-Antipolis Cedex, France, vol. RAN WG1, No. Athens, GR, Feb. 27, 2023-Mar. 3, 2023, Feb. 17, 2023, 57 Pages, XP052248543, sections 2.3-2.8, 3.2.

* cited by examiner

Receive first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot

1405

Receive second control information that indicates one or more sub-band full-duplex (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE

1410

Communicate with a network entity based on application of one of the one or more SBFD patterns to at least a subset of the set of multiple transmission time intervals

1415

1400

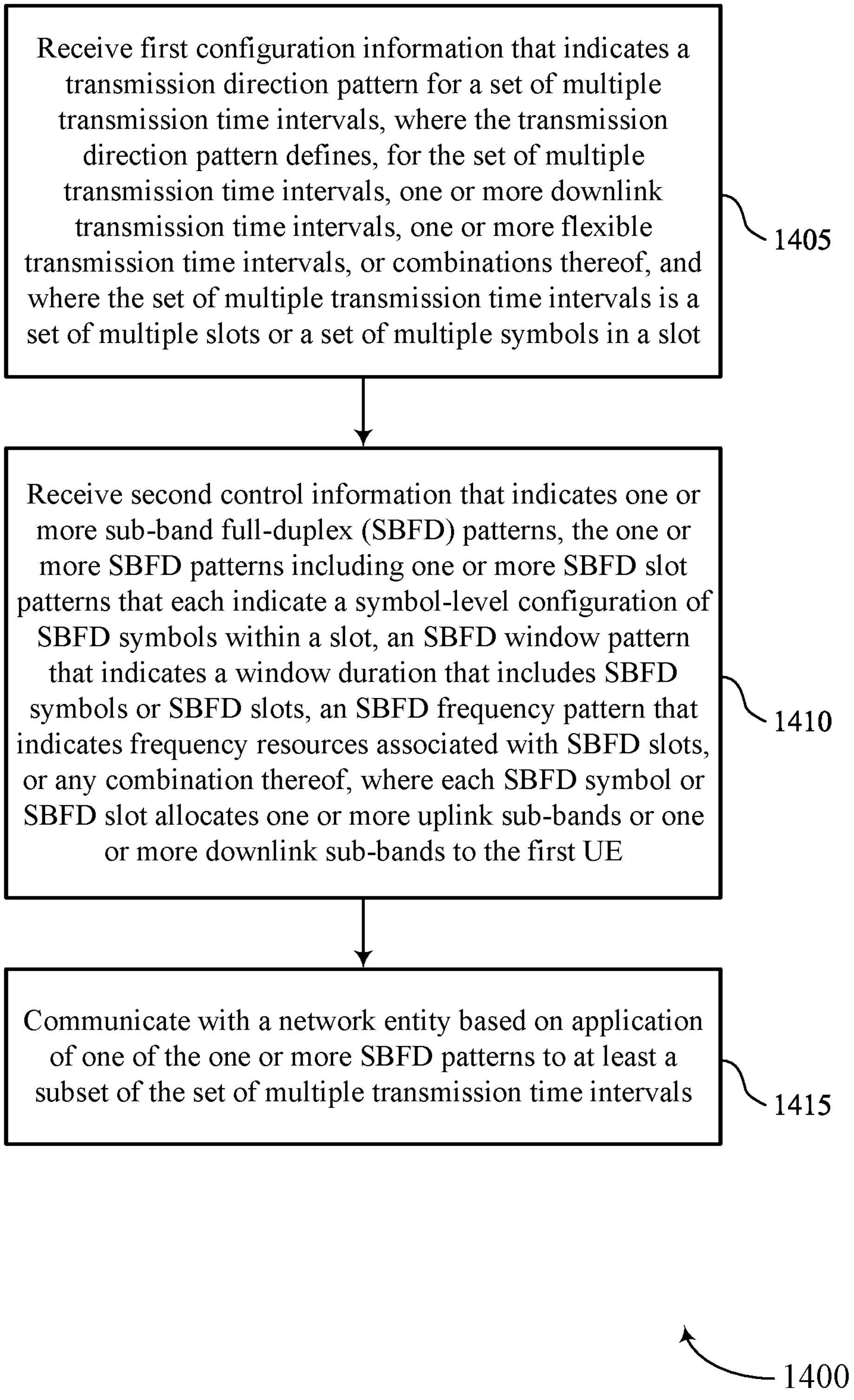

FIG. 14

TECHNIQUES FOR INDICATING TIME AND FREQUENCY LOCATIONS OF SUB-BAND FULL-DUPLEX SUB-BANDS

FIELD OF TECHNOLOGY

The following relates to wireless communications, including techniques for indicating time and frequency locations of sub-band full-duplex (SBFD) sub-bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for indicating time and frequency locations of sub-band full-duplex (SBFD) sub-bands. Generally, the techniques described herein may enable an SBFD network entity to indicate, to one or more half-duplex user equipments (UEs), which may be referred to as SBFD UEs, one or more SBFD patterns indicating time locations, frequency locations, or both, of SBFD sub-bands. For example, a UE may receive first configuration information indication a transmission direction pattern for multiple transmission time intervals, such as multiple slots or multiple symbols in a slot. The transmission direction pattern may define, for the multiple transmission time intervals, one or more downlink transmission time intervals, one or more flexible transmission time intervals, or any combination thereof. Additionally, the UE may receive second control information that indicates one or more SBFD patterns (e.g., for the network entity). In some cases, the one or more SBFD patterns may include one or more SBFD slot patterns, where each SBFD slot pattern indicates whether each symbol within a slot is an SBFD symbol or a non-SBFD symbol. Additionally, or alternatively, the one or more SBFD patterns may include an SBFD window pattern, where the SBFD window pattern indicates a window duration that includes SBFD symbols or SBFD slots. Additionally, or alternatively, the one or more SBFD patterns may include an SBFD frequency pattern, where the SBFD frequency pattern indicates frequency resources associated with SBFD slots. Though describes as SBFD symbols and SBFD slots, it is understood that, for a half-duplex (HD) UE, an SBFD symbol or SBFD slot (e.g., from the perspective of the network entity) allocates either one or more uplink sub-bands or one or more downlink sub-bands to the UE. Thus, the UE may communicate with the network entity based on application of one of the one or more SBFD patterns to at least a subset of the multiple transmission time intervals.

A method for wireless communications by a UE is described. The method may include receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, receiving second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE, and communicating with a network entity based on application of one of the one or more SBFD patterns to at least a subset of the set of multiple transmission time intervals.

A UE for wireless communications is described. The UE may include one or more memories storing processor executable code, and one or more processors coupled with the one or more memories. The one or more processors may individually or collectively operable to execute the code to cause the UE to receive first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, receive second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE, and communicate with a network entity based on application of one of the one or more SBFD patterns to at least a subset of the set of multiple transmission time intervals.

Another UE for wireless communications is described. The UE may include means for receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, means for receiving second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE, and means for communicating with a network entity based on application of one of the one or more SBFD patterns to at least a subset of the set of multiple transmission time intervals.

A non-transitory computer-readable medium storing code for wireless communications is described. The code may include instructions executable by one or more processors to receive first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, receive second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE, and communicate with a network entity based on application of one of the one or more SBFD patterns to at least a subset of the set of multiple transmission time intervals.

In some examples of the method, UE, and non-transitory computer-readable medium described herein, the one or more SBFD patterns includes an SBFD slot pattern and the method, apparatuses, and non-transitory computer-readable medium may include further operations, features, means, or instructions for applying the SBFD slot pattern to each transmission time interval of the one or more downlink transmission time intervals, the one or more flexible transmission time intervals, or the combinations thereof, where each transmission time interval may be a slot or a mini-slot.

In some examples of the method, UE, and non-transitory computer-readable medium described herein, the one or more SBFD patterns includes the SBFD slot pattern and the method, apparatuses, and non-transitory computer-readable medium may include further operations, features, means, or instructions for applying the SBFD slot pattern to the subset of the set of multiple transmission time intervals, where the subset may be defined by a first transmission time interval, a duration, a last transmission time interval, or any combination thereof, where each transmission time interval of the subset may be a slot or a mini-slot.

In some examples of the method, UE, and non-transitory computer-readable medium described herein, the second control information includes a first index associated with the first transmission time interval, an indication of the duration, a second index associated with the last transmission time interval, or any combination thereof.

In some examples of the method, UE, and non-transitory computer-readable medium described herein, the first transmission time interval may be a first downlink transmission time interval of the one or more downlink transmission time intervals.

In some examples of the method, UE, and non-transitory computer-readable medium described herein, each of the one or more SBFD slot patterns indicates whether each symbol within the slot may be an SBFD symbol or a non-SBFD symbol.

Some examples of the method, UE, and non-transitory computer-readable medium described herein may further include operations, features, means, or instructions for receiving an indication of a set of multiple SBFD slot patterns, each SBFD slot pattern of the set of multiple SBFD slot patterns associated with an index.

In some examples of the method, UE, and non-transitory computer-readable medium described herein, the one or more SBFD slot patterns includes a first SBFD slot pattern of the set of multiple SBFD slot patterns and a second SBFD slot pattern of the set of multiple SBFD slot patterns and the method, apparatuses, and non-transitory computer-readable medium may include further operations, features, means, or instructions for applying the first SBFD slot pattern to a first transmission time interval of the set of multiple transmission time intervals based on the second control information indicating a first index associated with the first SBFD slot pattern and applying the second SBFD slot pattern to a second transmission time interval of the set of multiple transmission time intervals based on the second control information indicating a second index associated with the second SBFD slot pattern.

In some examples of the method, UE, and non-transitory computer-readable medium described herein, the SBFD window pattern indicates a bitmap defining the window duration, the bitmap indicating whether each symbol or slot within the window duration may be an SBFD symbol or an SBFD slot.

In some examples of the method, UE, and non-transitory computer-readable medium described herein, the SBFD window pattern indicates a first index associated with a first symbol or first slot of the window duration, a second index associated with a last symbol or last slot of the window duration, a quantity of symbols or slots in the window duration, or any combination thereof.

In some examples of the method, UE, and non-transitory computer-readable medium described herein, the frequency resources indicate one or more uplink sub-bands, one or more downlink sub-bands, one or more guard bands, or any combination thereof.

In some examples of the method, UE, and non-transitory computer-readable medium described herein, the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

In some examples of the method, UE, and non-transitory computer-readable medium described herein, the one or more SBFD patterns includes the SBFD frequency pattern and the method, apparatuses, and non-transitory computer-readable medium may include further operations, features, means, or instructions for receiving an indication of a set of multiple SBFD frequency patterns including at least the SBFD frequency pattern, where each SBFD frequency pattern of the SBFD frequency patterns indicates frequency resources associated with SBFD slots and may be associated with a respective index.

In some examples of the method, UE, and non-transitory computer-readable medium described herein, the second control information includes an index associated with the SBFD frequency pattern.

In some examples of the method, UE, and non-transitory computer-readable medium described herein, the SBFD frequency pattern may be a default SBFD frequency pattern.

In some examples of the method, UE, and non-transitory computer-readable medium described herein, the frequency resources indicate one or more uplink sub-bands and one or more downlink sub-bands.

In some examples of the method, UE, and non-transitory computer-readable medium described herein, the frequency resources indicate one or more uplink sub-bands and one or more guard bands.

In some examples of the method, UE, and non-transitory computer-readable medium described herein, the frequency resources indicate one or more uplink sub-bands.

In some examples of the method, UE, and non-transitory computer-readable medium described herein, the one or more SBFD patterns may be cell-common or UE-specific.

In some examples of the method, UE, and non-transitory computer-readable medium described herein, the second control information may be received via broadcast, multicast, or unicast.

In some examples of the method, UE, and non-transitory computer-readable medium described herein, the second control information may be received via a radio resource control (RRC) message, a downlink control information (DCI) message, a medium access control-control element (MAC-CE) message, or any combination thereof.

In some examples of the method, UE, and non-transitory computer-readable medium described herein, the one or more SBFD patterns may be associated with one or more component carriers (CCs).

A method for wireless communications by a network entity is described. The method may include transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, transmitting second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE, and communicating with the first UE and the second UE based on at least one of the one or more SBFD patterns to at least a subset of the set of multiple transmission time intervals.

A network entity for wireless communications is described. The network entity may include one or more memories storing processor executable code, and one or more processors coupled with the one or more memories. The one or more processors may individually or collectively operable to execute the code to cause the network entity to transmit first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, transmit second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE, and communicate with the first UE and the second UE based on at least one of the one or more SBFD patterns to at least a subset of the set of multiple transmission time intervals.

Another network entity for wireless communications is described. The network entity may include means for transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, means for transmitting second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE, and means for communicating with the first UE and the second UE based on at least one of the one or more SBFD patterns to at least a subset of the set of multiple transmission time intervals.

A non-transitory computer-readable medium storing code for wireless communications is described. The code may include instructions executable by one or more processors to transmit first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot, transmit second control information that indicates one or more SBFD patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE, and communicate with the first UE and the second UE based on at least one of the one or more SBFD patterns to at least a subset of the set of multiple transmission time intervals.

In some examples of the method, network entities, and non-transitory computer-readable medium described herein, the one or more SBFD patterns includes an SBFD slot pattern, the SBFD slot pattern may be applied to each transmission time interval of the one or more downlink transmission time intervals, the one or more flexible transmission time intervals, or the combinations thereof, and each transmission time interval may be a slot or a mini-slot.

In some examples of the method, network entities, and non-transitory computer-readable medium described herein, the one or more SBFD patterns includes the SBFD slot pattern, the SBFD slot pattern may be applied to the subset of the set of multiple transmission time intervals, the subset may be defined by a first transmission time interval, a duration, a last transmission time interval, or any combination thereof, and each transmission time interval of the subset may be a slot or a mini-slot.

In some examples of the method, network entities, and non-transitory computer-readable medium described herein, the second control information includes a first index associated with the first transmission time interval, an indication of the duration, a second index associated with the last transmission time interval, or any combination thereof.

In some examples of the method, network entities, and non-transitory computer-readable medium described herein, the first transmission time interval may be a first downlink transmission time interval of the one or more downlink transmission time intervals.

In some examples of the method, network entities, and non-transitory computer-readable medium described herein, each of the one or more SBFD slot patterns indicates whether each symbol within the slot may be an SBFD symbol or a non-SBFD symbol.

Some examples of the method, network entities, and non-transitory computer-readable medium described herein may further include operations, features, means, or instructions for transmitting an indication of a set of multiple SBFD slot patterns, each SBFD slot pattern of the set of multiple SBFD slot patterns associated with an index.

In some examples of the method, network entities, and non-transitory computer-readable medium described herein, the one or more SBFD slot patterns includes a first SBFD slot pattern of the set of multiple SBFD slot patterns and a second SBFD slot pattern of the set of multiple SBFD slot patterns, the first SBFD slot pattern may be applied to a first transmission time interval of the set of multiple transmission time intervals based on the second control information indicating a first index associated with the first SBFD slot pattern and the second SBFD slot pattern may be applied to a second transmission time interval of the set of multiple transmission time intervals based on the second control information indicating a second index associated with the second SBFD slot pattern.

In some examples of the method, network entities, and non-transitory computer-readable medium described herein, the SBFD window pattern indicates a bitmap defining the window duration, the bitmap indicating whether each symbol or slot within the window duration may be an SBFD symbol or an SBFD slot.

In some examples of the method, network entities, and non-transitory computer-readable medium described herein, the SBFD window pattern indicates a first index associated with a first symbol or first slot of the window duration, a second index associated with a last symbol or last slot of the window duration, a quantity of symbols or slots in the window duration, or any combination thereof.

In some examples of the method, network entities, and non-transitory computer-readable medium described herein, the frequency resources indicate one or more uplink sub-bands, one or more downlink sub-bands, one or more guard bands, or any combination thereof.

In some examples of the method, network entities, and non-transitory computer-readable medium described herein, the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

In some examples of the method, network entities, and non-transitory computer-readable medium described herein, the one or more SBFD patterns includes the SBFD frequency pattern and the method, apparatuses, and non-transitory computer-readable medium may include further operations, features, means, or instructions for transmitting an indication of a set of multiple SBFD frequency patterns including at least the SBFD frequency pattern, where each SBFD frequency pattern of the SBFD frequency patterns indicates frequency resources associated with SBFD slots and may be associated with a respective index.

In some examples of the method, network entities, and non-transitory computer-readable medium described herein, the second control information includes an index associated with the SBFD frequency pattern.

In some examples of the method, network entities, and non-transitory computer-readable medium described herein, the SBFD frequency pattern may be a default SBFD frequency pattern.

In some examples of the method, network entities, and non-transitory computer-readable medium described herein, the frequency resources indicate one or more uplink sub-bands and one or more downlink sub-bands.

In some examples of the method, network entities, and non-transitory computer-readable medium described herein, the frequency resources indicate one or more uplink sub-bands and one or more guard bands.

In some examples of the method, network entities, and non-transitory computer-readable medium described herein, the frequency resources indicate one or more uplink sub-bands.

In some examples of the method, network entities, and non-transitory computer-readable medium described herein, the one or more SBFD patterns may be cell-common or UE-specific.

In some examples of the method, network entities, and non-transitory computer-readable medium described herein, the second control information may be broadcast, multicast, or unicast.

In some examples of the method, network entities, and non-transitory computer-readable medium described herein, the second control information may be transmitted via a RRC message, a DCI message, a MAC-CE message, or any combination thereof.

In some examples of the method, network entities, and non-transitory computer-readable medium described herein, the one or more SBFD patterns may be associated with one or more CCs.

BRIEF DESCRIPTION OF THE DRAWINGS

FIGS. 14 and 15 show flowcharts illustrating methods that support techniques for indicating time and frequency locations of SBFD sub-bands in accordance with one or more aspects of the present disclosure.

DETAILED DESCRIPTION

Figure 1:
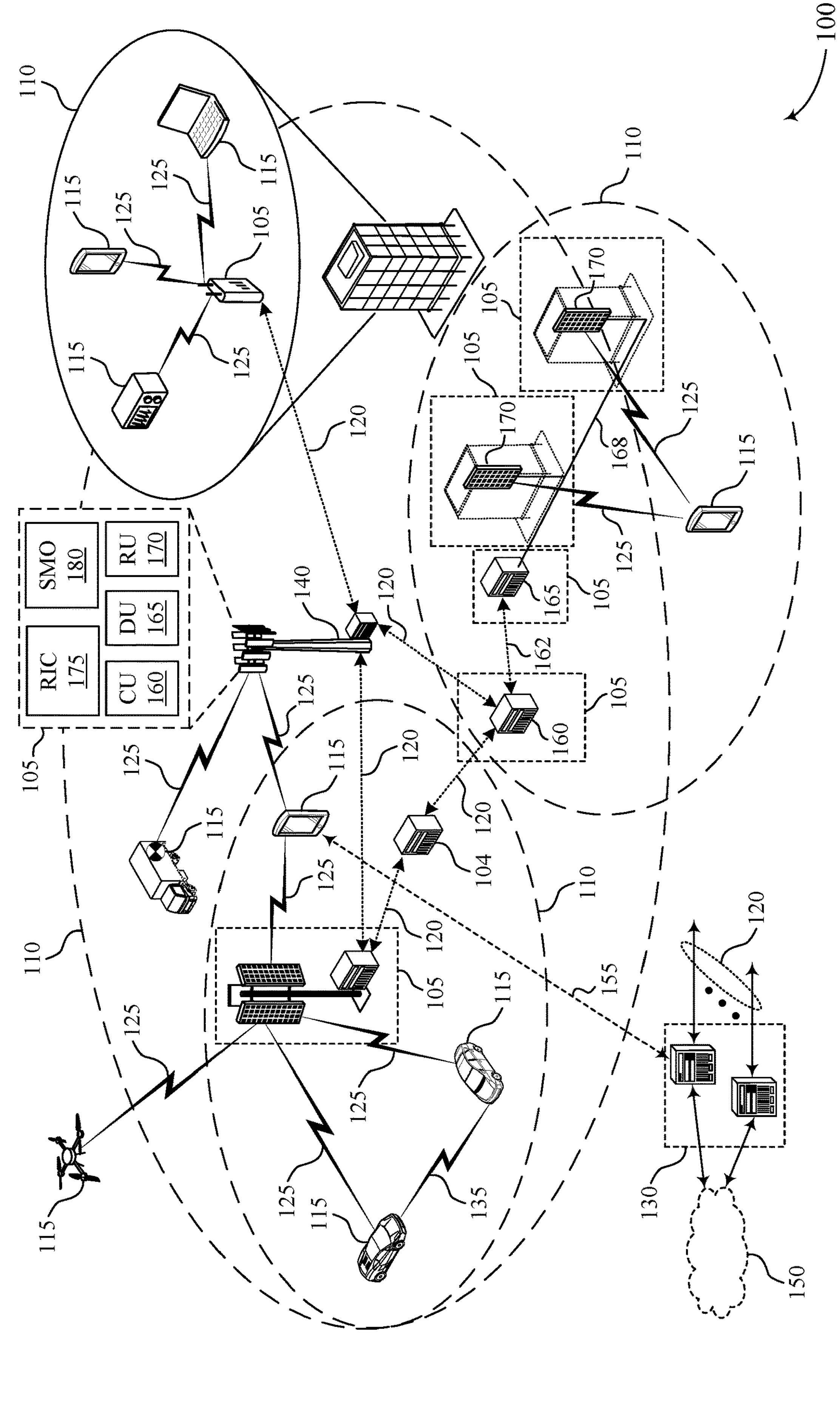
FIG. 1 shows an example of a wireless communications system that supports techniques for indicating time and frequency locations of sub-band full-duplex (SBFD) sub-bands in accordance with one or more aspects of the present disclosure.

In some wireless communications system, a network entity may operate according to a sub-band full-duplex (SBFD) mode. In such cases, the network entity may communicate via SBFD symbols or SBFD slots, in which the network entity may communicate via both one or more uplink sub-bands (e.g., uplink resources) and one or more downlink sub-bands (e.g., downlink resources) in each SBFD symbol or SBFD slot. In some cases, a UE (e.g., SBFD capable UE) may also operate according to an SBFD mode, such that the UE communicates, with the network entity, via both the one or more uplink sub-bands and the one or more downlink sub-bands in each SBFD symbol or SBFD slot. Conversely, the UE (e.g., SBFD aware UE) may operate according to a half-duplex (HD) mode but may be aware of the network entity operating according to the SBFD mode. In such cases, the network entity may indicate, to the HD UE, one or more SBFD symbols or SBFD slots, however, the UE may communicate via either the uplink resources or the downlink resources in each SBFD symbol or SBFD slot. Thus, the UE may need to be aware of time and frequency locations of the one or more uplink sub-bands and the one or more downlink sub-bands for each SBFD symbol or SBFD slot, such that the UE may adjust behavior of the UE accordingly. However, conventional techniques may be deficient or require significant overhead.

Accordingly, techniques described herein may support indicating time and frequency locations of SBFD sub-bands (e.g., the one or more uplink sub-bands and the one or more downlink sub-bands) for SBFD symbols or SBFD slots to an SBFD aware UE. For example, an SBFD aware UE may receive configuration information indicating a transmission direction for multiple transmission time intervals, such as multiple symbols or multiple slots, where the transmission direction defines one or more downlink transmission time intervals, one or more uplink transmission time intervals, or both. Additionally, an SBFD network entity may transmit, to the SBFD aware UE (e.g., HD UE), an indication of one or more SBFD patterns. In some examples, the one or more SBFD patterns may include one or more SBFD slot patterns, where each SBFD slot pattern indicates whether each symbol in an SBFD slot is an SBFD symbol or a non-SBFD symbol. Additionally, or alternatively, the one or more SBFD patterns may include an SBFD window pattern, where the SBFD window pattern indicates a window, or duration, including SBFD symbols or SBFD slots. Additionally, or alternatively, the one or more SBFD patterns may include an SBFD frequency pattern, where the SBFD frequency pattern indicates one or more uplink slots, one or more downlink slots, one or more guard bands, or any combination thereof, for an SBFD slot. Thus, the UE may apply the one or more SBFD patterns to at least a subset of the multiple transmission time intervals (e.g., symbols or slots) and communicate with the SBFD network entity based on the application.

Aspects of the disclosure are initially described in the context of wireless communications systems. Aspects of the disclosure are then described in the context of an SBFD window pattern, an SBFD frequency pattern, and a process flow. Aspects of the disclosure are further illustrated by and described with reference to apparatus diagrams, system diagrams, and flowcharts that relate to techniques for indicating time and frequency locations of SBFD sub-bands.

FIG. 1 shows an example of a wireless communications system 100 that supports techniques for indicating time and frequency locations of SBFD sub-bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for indicating time and frequency locations of SBFD sub-bands as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications system, a network entity may operate according to a sub-band full-duplex (SBFD) mode. In such cases, the network entity may communicate via SBFD symbols or SBFD slots, in which the network entity may communicate via both one or more uplink sub-bands (e.g., uplink resources) and one or more downlink sub-bands (e.g., downlink resources) in each SBFD symbol or SBFD slot. In some cases, a UE (e.g., SBFD capable UE) may also operate according to an SBFD mode, such that the UE communicates, with the network entity, via both the one or more uplink sub-bands and the one or more downlink sub-bands in each SBFD symbol or SBFD slot. Conversely, the UE (e.g., SBFD aware UE) may operate according to a half-duplex (HD) mode but may be aware of the network entity operating according to the SBFD mode. In such cases, the network entity may indicate, to the HD UE, one or more SBFD symbols or SBFD slots, however, the UE may communicate via either the uplink resources or the downlink resources in each SBFD symbol or SBFD slot. Thus, the UE may need to be aware of time and frequency locations of the one or more uplink sub-bands and the one or more downlink sub-bands for each SBFD symbol or SBFD slot, such that the UE may adjust behavior of the UE accordingly. However, conventional techniques may be deficient or require significant overhead.

The wireless communications system 200 may support techniques for indicating time and frequency locations of SBFD sub-bands (e.g., the one or more uplink sub-bands and the one or more downlink sub-bands) for SBFD symbols or SBFD slots to an SBFD aware UE 115. For example, an SBFD aware UE 115 may receive configuration information indicating a transmission direction for multiple transmission time intervals, such as multiple symbols or multiple slots, where the transmission direction defines one or more downlink transmission time intervals, one or more uplink transmission time intervals, or both. Additionally, an SBFD network entity 105 may transmit, to the SBFD aware UE 115 (e.g., HD UE 115), an indication of one or more SBFD patterns. In some examples, the one or more SBFD patterns may include one or more SBFD slot patterns, where each SBFD slot pattern indicates whether each symbol in an SBFD slot is an SBFD symbol or a non-SBFD symbol. Additionally, or alternatively, the one or more SBFD patterns may include an SBFD window pattern, where the SBFD window pattern indicates a window, or duration, including SBFD symbols or SBFD slots. Additionally, or alternatively, the one or more SBFD patterns may include an SBFD frequency pattern, where the SBFD frequency pattern indicates one or more uplink slots, one or more downlink slots, one or more guard bands, or any combination thereof, for an SBFD slot. Thus, the UE 115 may apply the one or more SBFD patterns to at least a subset of the multiple transmission time intervals (e.g., symbols or slots) and communicate with the SBFD network entity 105 based on the application.

Figure 2:
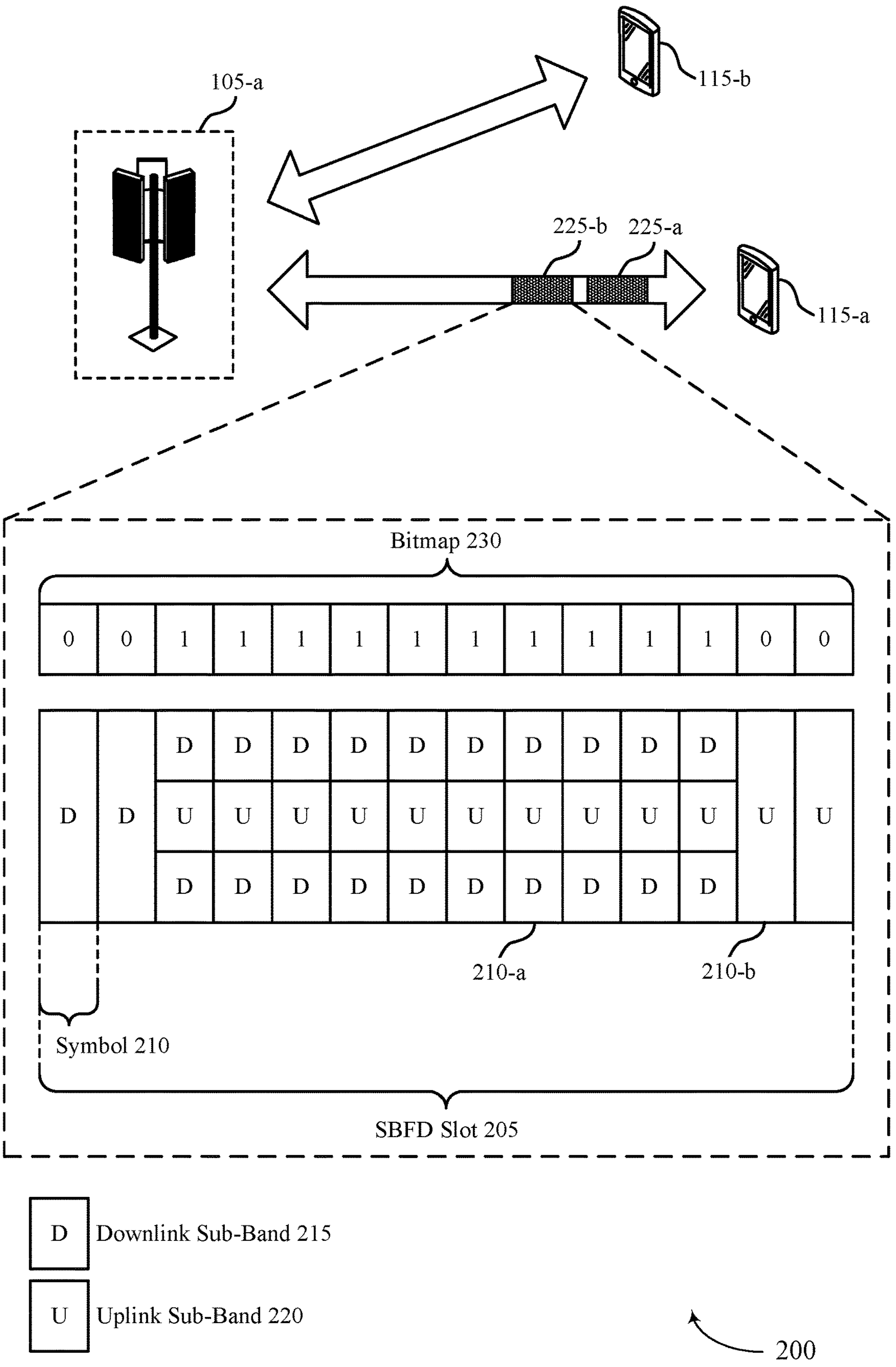
FIG. 2 shows an example of a wireless communications system that supports techniques for indicating time and frequency locations of SBFD sub-bands in accordance with one or more aspects of the present disclosure.

FIG. 2 shows an example of a wireless communications system 200 that supports techniques for indicating time and frequency locations of SBFD sub-bands in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a*) and one or more UEs 115 (e.g., a UE 115-*a* and a UE 115-*b*), which may be examples of the corresponding devices described herein with reference to FIG. 1.

In some wireless communications systems, such as the wireless communications system 200, a network entity 105, such as the network entity 105-*a*, may be capable of operating according to an SBFD mode (e.g., sub-band non-overlapping full-duplex). In such cases, the network entity 105-*a* may configure one or more slots 205 (e.g., or symbols 210) with both uplink resources (e.g., one or more uplink sub-bands 220) and downlink resources (e.g., one or more downlink sub-bands 215). In such cases, the slot 205 may be referred to as an SBFD slot 205. For example, the network entity 105-*a* may configure an SBFD slot 205 such that the SBFD slot 205 supports a downlink sub-band 215, an uplink sub-band 220, and a downlink sub-band 215. In such cases, the downlink sub-bands 215 and the uplink sub-band 220 may be separated by respective guard bands (e.g., without restriction on frequency ranges of each sub-band or guard band). In another example, the network entity 105-*a* may configure the SBFD slot 205 such that the SBFD slot 205 supports a downlink sub-band 215 and an uplink sub-band 220 (e.g., single configured uplink BWP and downlink BWP pair with aligned center frequencies). In some examples, the downlink sub-band 215 and the uplink sub-band 220 may be separated by a guard band (e.g., without restriction on frequency ranges of each sub-band or guard band). As such, in each SBFD slot 205, the network entity 105-*a* may communicate with a first UE 115, such as the UE 115-*a*, via downlink sub-bands 215 and may communicate with a second UE 115, such as the UE 115-*b*, via uplink sub-bands 220.

In some examples, the network entity 105-*a* may support SBFD in a TTD carrier (e.g., CC) or in intra-band CA (e.g. dynamic or flexible TDD). In such cases, the network entity 105-*a* may support simultaneous transmission and reception of downlink and uplink communications, respectively, on a sub-band basis. In some examples, the network entity 105-*a*, operating according to the SBFD mode, may increase an uplink duty cycle, which may increase uplink coverage and decrease latency (e.g., it is possible to transmit uplink signals in an uplink sub-band 220 in a downlink only or flexible slots 205 or receive downlink signals in downlink sub-band(s) 215 in legacy only uplink slots 205). Additionally, or alternatively, the network entity 105-*a*, operating according to the SBFD mode, may enhance system capacity, enhance resource utilization, enhance spectrum efficiency, and enable flexible and dynamic uplink and downlink resource adaption according to uplink and downlink traffic (e.g., in a robust manner), another other advantages.

In some examples (e.g., not depicted), a UE 115 may be capable of operating according to an SBFD mode. In such cases, the UE 115 may be referred to as an SBFD capable UE 115. In other words, the SBFD capable UE 115 may simultaneously communicate with one or more network entities 105 (e.g., cells) via downlink sub-band(s) 215 and via uplink sub-band(s) 220 in a same SBFD slot 205. Alternatively (e.g., depicted), a UE 115, such as the UE 115-*a* (e.g., and the UE 115-*b*), may operate according to a HD mode, but may be aware that a network entity 105, such as the network entity 105-*a*, is operating according to an SBFD mode. In such cases, the UE 115-*a* may be referred to as an SBFD aware UE 115-*a*. In other words, the SBFD aware UE 115-*a* may communicate with the network entity 105-*a* via either the downlink sub-band(s) 215 or via uplink sub-band(s) 220 in the same SBFD slot 205.

In such cases, the SBFD aware UE 115-*a* (e.g., in an RRC_CONNECTED state) may need to be aware of both time and frequency locations of sub-bands for SBFD operations in an SBFD slot 205, such that the SBFD aware UE 115-*a* may modify a behavior of the SBFD aware UE 115-*a* based on the SBFD slot 205. That is, the SBFD aware UE 115-*a* may be associated with different transmission behaviors (e.g., procedures), reception behaviors, measurement behaviors, or any combination thereof, for SBFD slots 205 and non-SBFD slots 205. Additionally, time and frequency locations (e.g., time domain location(s) and frequency domain location(s)) of one or more downlink sub-bands 215 and one or more uplink sub-bands 220 in an SBFD slot 205 may not be fixed. As such, the SBFD aware UE 115-*a* may need to be aware of both the time and the frequency domain locations of the one or more downlink sub-bands 215 and the one or more uplink sub-bands 220 in the SBFD slot 205, such that the SBFD aware UE 115-*a* may determine when and how to modify a behavior of the SBFD aware UE 115-*a*.

However, conventional techniques for indicating time and frequency domain locations of sub-bands (e.g., downlink sub-band(s) 215 and uplink sub-band(s) 220) for SBFD slots 205 may be deficient or result in increased signaling overhead. For example, the network entity 105-*a* may transmit a bitmap indicating whether each slot 205 configured for the UE 115-*a* is an SBFD slot 205. In such cases, the bitmap be of a same length and periodicity as a TDD uplink and downlink pattern and periodicity, resulting in increased signaling overhead.

Accordingly, techniques described herein may enable an SBFD capable network entity 105, such as the network entity 105-*a*, to indicate to an SBFD aware UE 115, such as the UE 115-*a*, one or more SBFD patterns associated with multiple transmission time intervals, such as a slot 205 or a symbol 210. For example, the network entity 105-*a* may transmit, to the UE 115-*a*, a control message 225-*a* indicating configuration information associated with a transmission direction pattern for multiple slots 205 (e.g., tdd-UL-DL-configurationcommon or tdd-UL-DL-configurationdedicated). That is, the transmission direction pattern may indicate whether each slot 205 configured for the UE 115-*a* (e.g., in a given duration) is an uplink slot 205, a downlink slot 205, or a flexible slot 205. In such cases, one or more downlink slots 205, one or more flexible slots 205, or both, configured for a UE 115-*a* may be SBFD slots 205.

Additionally, the UE 115-*a* may receive a control message 225-*b* indicating one or more SBFD slot patterns (e.g., a higher layer parameter, such as an RRC parameter TDD-UL-DL-SBFD-slot-pattern). In such cases, each SBFD slot pattern may indicate a per symbol level time domain configuration of whether each symbol 210 of an SBFD slot 205 is an SBFD symbol 210 or a non-SBFD symbol 210 (e.g., legacy symbol 210). In some cases, the indication of the one or more SBFD slot patterns may be a bitmap indication of symbol level with a same length as the SBFD slot 205. That is, each SBFD slot pattern may be associated with a bitmap 230 that indicates whether each symbol 210 of an SBFD slot 205 is an SBFD symbol 210 or a non-SBFD symbol 210. For example, as depicted in FIG. 2, an SBFD slot 205 may include 14 symbols. Additionally, each symbol 210 in the SBFD slot 205 may be an SBFD symbol 210, such as a symbol 210-*a*, or a non-SBFD symbol 210, such as a symbol 210-*b*. As such, the control message 225-*b* may include a bitmap 230 indicating a "0" for each non-SBFD symbol 210 and a "1" for each SBFD symbol 210. In other words, for the SBFD slot 205 depicted in FIG. 2, the control message 225-*b* may include a bitmap of 00111111111100, indicating that the SBFD slot 205 may include 2 non-SBFD symbols 210 followed by 10 SBFD symbols 210 followed by 2 non-SBFD symbols 210.

In some cases, the UE 115-*a* may apply (e.g., implicitly) an indicated SBFD slot pattern to each downlink slot 205, flexible slot 205, or both, configured as an SBFD slot 205. In other words, each SBFD slot 205 (e.g., all SBFD slots 205) configured for the UE 115-*a* may share a same SBFD slot pattern, where the same SBFD slot pattern is the indicated SBFD slot pattern. In some other cases, the UE 115-*a* may apply the indicated SBFD slot pattern to each downlink slot 205, flexible slot 205, or both, configured as an SBFD slot 205 in a period (e.g., duration) That is, the UE 115-*a* may receive (e.g., with the SBFD slot pattern) an indication of a starting slot 205 (e.g., a first downlink slot 205 or a first flexible slot 205) and a length (e.g., duration) or the starting slot 205 and an ending slot 205, where the starting slot 205 and the length or the starting slot 205 and the ending slot 205 define the period. As such, the UE 115-*a* may apply the indicated SBFD slot pattern to each SBFD slot 205 (e.g., each downlink slot 205, flexible slot 205, or both, configured as an SBFD slot 205) in the period. In such cases, the starting slot 205, the ending slot 205, or both, may be indicated via a respective index. Additionally, or alternatively, the starting slot 205 may be a first downlink slot 205 configured for the UE 115-*a* (e.g., if the starting slot 205 is not indicated, or configured, for the UE 115-*a*).

In some cases, the control message 225-*b* may include the bitmap 230 associated with the SBFD slot pattern. In some other cases, the control message 225-*b*may include an index associated with the indicated SBFD slot pattern. That is, the network entity 105-*a* may transmit (e.g., in a control message 205) an indication of multiple SBFD slot patterns and an index associated with each SBFD slot pattern (e.g., bitmap 230) of the multiple SBFD slot patterns. That is, the network entity 105-*a* may configure (e.g., pre-configure), for the UE 115-*a*, a table of different SBFD slot patterns and an index associated with each SBFD slot pattern. As such, the control message 225-*b* may include an index associated with an SBFD slot pattern, such that the UE 115-*a* may identify the indicated SBFD slot pattern based on the index and apply a bitmap 230 associated with the SBFD slot pattern to each SBFD slot 205 (e.g., all SBFD slots 205 or each SBFD slot 205 in a period).

In some cases, the control message 225-*b* may indicate a respective index (e.g., associated with a respective SBFD slot pattern) for each SBFD slot 205 configured for the UE 115-*a*. That is, for each SBFD slot 205, the control message 225-*b* may indicate an index associated with an SBFD slot pattern, such that UE 115-*a* may apply a different SBFD slot pattern 205 for each SBFD slot 205. For example, the control message 225-*b* may indicate that a first SBFD slot pattern is to be applied to a first SBFD slot 205, a second SBFD slot pattern is to be applied to a second SBFD slot 205, the first SBFD slot pattern is to be applied to a third SBFD slot 205, and a third SBFD slot pattern is to be applied to a fourth SBFD slot 205.

Additionally, or alternatively, the control message 225-*b* may indicate an SBFD window pattern, as described with reference to FIG. 3, an SBFD frequency pattern, as described with reference to FIG. 4, or both. As such, the UE 115-*a* may communicate with the network entity 105-*a* based on applying the one or more SBFD slot patterns, the SBFD window pattern, the SBFD frequency pattern, or any combination thereof, to at least a subset of SBFD slots 205 (e.g., one or more downlink slots 205, one or more flexible slots 205, or both) configured for the UE 115-*a*. For example, as described with reference to FIG. 2, the UE 115-*a* may receive downlink communications from the network entity 105-*a* via a first symbol 210 and a second symbol 210 of the SBFD slot 205 and may transmit uplink communications to the network entity 105-*a* via a thirteenth symbol 210 (e.g., the symbol 210-*b*) and a fourteenth symbol 210. Additionally, in some cases, the network entity 105-*a* may allocate downlink sub-bands 215 in SBFD symbols 210 (e.g., such as the SBFD symbol 210-*a*) to the UE 115-*a*, such that the UE 115-*a* receives downlink communications from the network entity 105-*a* via each of a third symbol 210 through a twelfth symbol 210 of the SBFD slot 205. Alternatively, the network entity 105-*a* may allocate uplink sub-bands 220 in SBFD symbols 210 to the UE 115-*a*, such that the UE 115-*a* transmits uplink communications to the network entity 105-*a* via each of the third symbol 210 through the twelfth symbol 210 of the SBFD slot 205.

In some cases, each SBFD pattern of the one or more SBFD patterns (e.g., SBFD slot pattern(s), SBFD window pattern(s), SBFD frequency pattern(s)) may be cell common or UE-specific (e.g., UE dedicated). Additionally, or alternatively, the one or more SBFD patterns may be applied (e.g., may be for) a single CC or multiple CCs. Additionally, or alternatively, the network entity 105-*a* may broadcast, unicast, or multicast the control message 225-*b* indicating the one or more SBFD patterns. Additionally, or alternatively, the control message 225-*b* may be an RRC message, a downlink control information (DCI) message, or a medium access control (MAC)-control element (MAC-CE) message.

Figure 3:
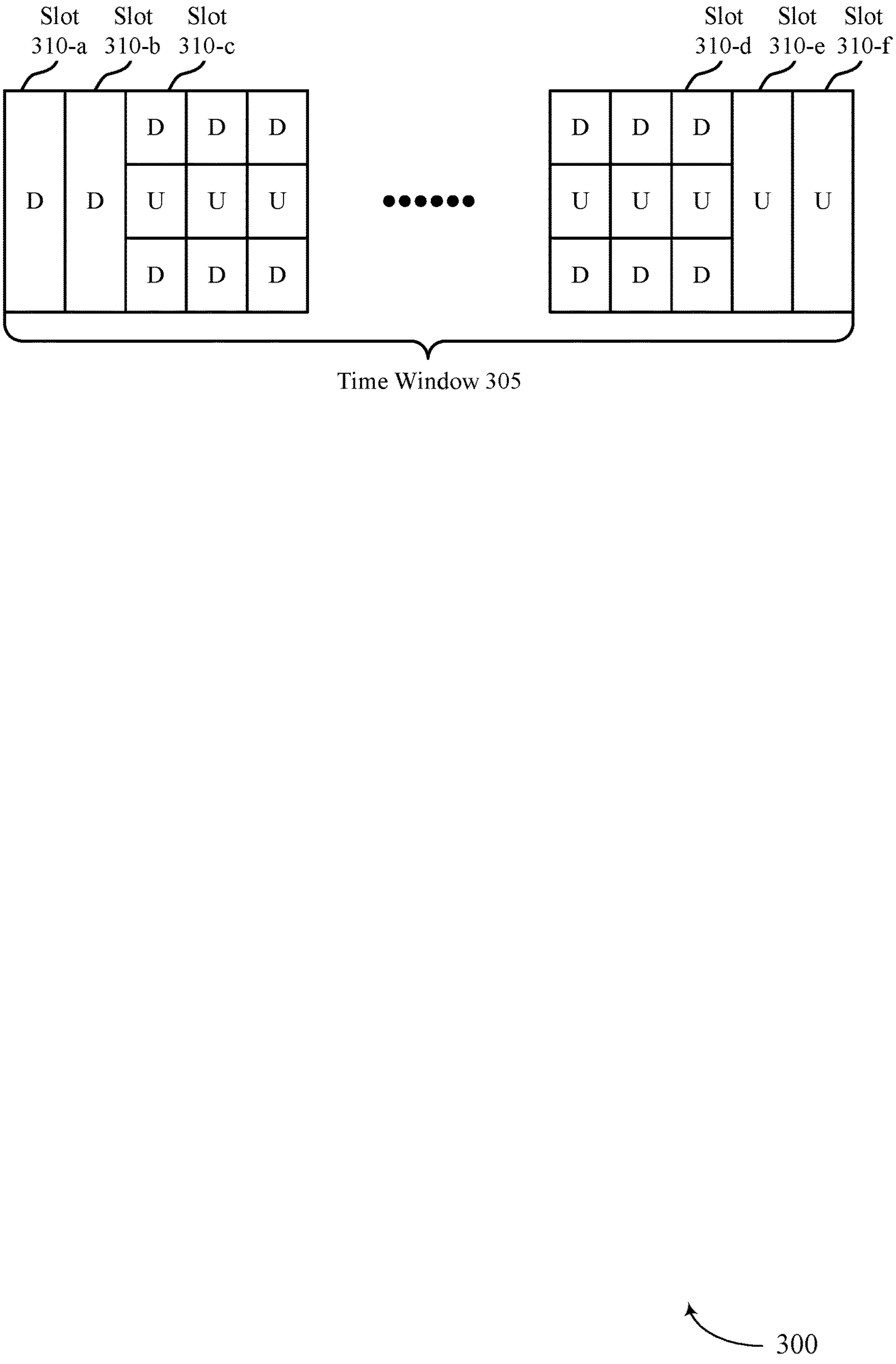
FIG. 3 shows an example of an SBFD window pattern that supports techniques for indicating time and frequency locations of SBFD sub-bands in accordance with one or more aspects of the present disclosure.

FIG. 3 shows an example of an SBFD window pattern 300 that supports techniques for indicating time and frequency locations of SBFD sub-bands in accordance with one or more aspects of the present disclosure. In some examples, the SBFD window pattern 300 may implement or be implemented by aspects of the wireless communications system 100, the wireless communications system 200, or both. For example, the SBFD window pattern 300 may be implemented by one or more network entities 105 and one or more UEs 115, which may be examples of the corresponding devices described herein with reference to FIG. 1.

As described previously, techniques described herein may enable an SBFD capable network entity 105 to indicate to an SBFD aware UE 115 one or more SBFD patterns associated with multiple transmission time intervals, such as a slot 310 or a symbol. For example, the network entity 105 may transmit, to the SBFD aware UE 115, a control message indicating one or more SBFD slot patterns (e.g., a higher layer parameter, such as an RRC parameter TDD-UL-DL-SBFD-window-pattern). In such cases, each SBFD window pattern may indicate a time window level time domain configuration of whether each slot 310 (e.g., or symbol) in a window 305 (e.g., time window, duration) is an SBFD slot 310 (e.g., or SBFD symbol) or a non-SBFD slot 310 (e.g., or non-SBFD symbol). For example, as described with reference to FIG. 3, the network entity 105 may transmit an indication of an SBFD window pattern, where the SBFD window pattern indicates that, for a window 305, a slot 310-*a* and a slot 310-*b* are non-SBFD slots 310, a slot 310-*c* through a slot 310-*d* are SBFD slots 310, and a slot 310-*c* and a slot 310-*f* are non-SBFD slots 310.

In some cases, the control message may indicate a bitmap associated with the SBFD window pattern, where the bitmap indicates whether each slot 310 in the window 305 is an SBFD slot 310 or a non-SBFD slot 310. For example, the control message may indicate a bitmap associated with the window 305, where the bitmap indicates a "0" for each non-SBFD slot 310 in the window 305 and a "1" for each SBFD slot 310 in the window 305. That is, in the context of FIG. 3, the control message may indicate a "0" for each of the slot 310-*a* and the slot 310-*b*, a "1" for each of the slot 310-*c* through the slot 310-*d*, and a "0" for each of the slot 310-*e* and the slot 310-*f*.

Additionally, or alternatively, the control message may indicate, for a window 305, a portion of the window 305 that includes SBFD slots 310. For example, the control message may indicate a starting slot 310 and a length (e.g., duration), where the length includes a quantity of SBFD slots 310. For example, the slot 310-*c* to the slot 310-*d* may include 20 slots. As such, the control message may indicate the slot 310-*c* (e.g., as the starting slot 310) and a length of 20 slots. In some other examples, the control message may indicate an offset and a length (e.g., duration), where the length includes a quantity of SBFD slots 310. For example, the control message may indicate an offset value of 3 (e.g., 3 slots 310) and a length of 20 slots.

In some cases, the network entity 105 may transmit to the SBFD aware UE 115 an indication (e.g., in a control message) of multiple SBFD window patterns, where each SBFD window pattern indicates a window 305 (e.g., duration) and whether each slot 310 in the window 305 is an SBFD slot 310 or a non-SBFD slot 310. Additionally, each SBFD window pattern may be associated with a respective index. As such, the network entity 105 may transmit, to the SBFD aware UE 115, a control message indicating one or more indices associated with respective SBFD window patterns. For example, the control message may indicate a first index associated with a first SBFD window pattern is to be applied by the SBFD aware UE 115. Additionally, or alternatively, the control message may indicate a periodicity associated with the SBFD window pattern. In other words, each SBFD window pattern may be periodic or repeatable. For example, the control message may indicate for the SBFD aware UE 115 to apply the first SBFD window pattern every 20 slots 310.

Though described in the context of slots 310 in a window 305, this is not to be regarded as a limitation of the present disclosure. In this regard, as described previously, an SBFD window pattern may indicate whether each symbol in a window 305 is an SBFD symbol or a non-SBFD symbol, such that techniques described herein may be applied at a symbol-level granularity, as well as a slot-level granularity. For example, the control message may indicate a bitmap associated with the SBFD window pattern, where the bitmap indicates whether each symbol in the window 305 is an SBFD symbol or a non-SBFD symbol. Additionally, or alternatively, the control message may indicate for a window 305, a portion of the window 305 that includes SBFD symbols. For example, the control message may indicate a starting symbol and a length or an offset value and the length, where the length includes a quantity of SBFD symbols.

Figure 4:
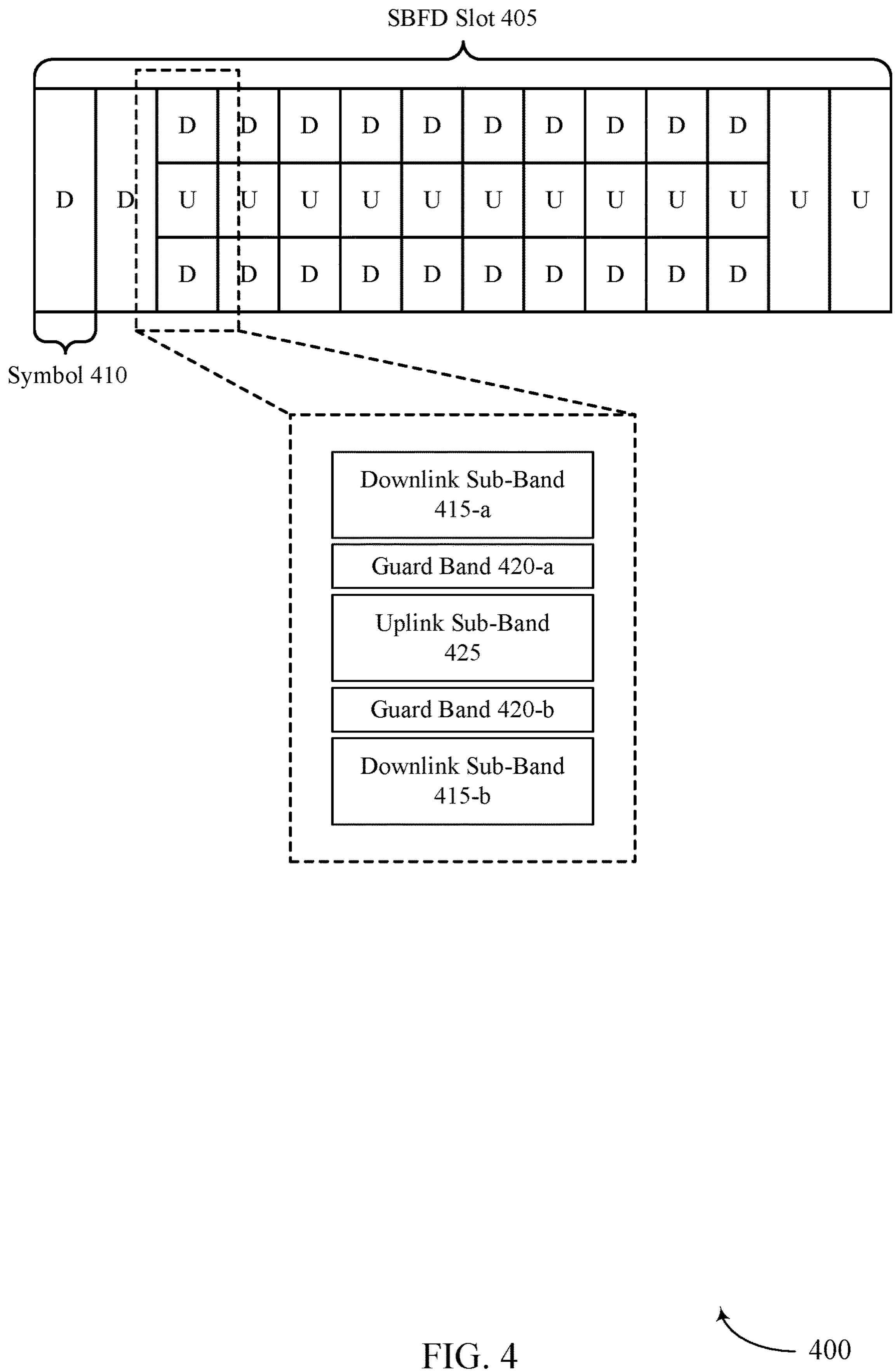
FIG. 4 shows an example of an SBFD frequency pattern that supports techniques for indicating time and frequency locations of SBFD sub-bands in accordance with one or more aspects of the present disclosure.

FIG. 4 shows an example of an SBFD frequency pattern 400 that supports techniques for indicating time and frequency locations of SBFD sub-bands in accordance with one or more aspects of the present disclosure. In some examples, the SBFD frequency pattern 400 may implement or be implemented by aspects of the wireless communications system 100, the wireless communications system 200, the SBFD window pattern 300, or any combination thereof. For example, the SBFD frequency pattern 400 may be implemented by one or more network entities 105 and one or more UEs 115, which may be examples of the corresponding devices described herein with reference to FIG. 1.

As described previously, techniques described herein may enable an SBFD capable network entity 105 to indicate to an SBFD aware UE 115 one or more SBFD patterns associated with multiple transmission time intervals, such as a slot 405 or a symbol 410. For example, the network entity 105 may transmit, to the SBFD aware UE 115, a control message indicating an SBFD frequency pattern (e.g., a higher layer parameter, such as an RRC parameter TDD-UL-DL-SBFD-frequency-pattern, or re-using TDD-UL-DL-SBFD-slot-pattern,). In such cases, the SBFD frequency pattern may indicate frequency resources of one or more sub-bands in each SBFD slot 405 (e.g., or SBFD symbol 410). In other words, the SBFD frequency pattern may indicate a location (e.g., frequency location) of one or more downlink sub-bands 415, one or more guard bands 420, one or more sub-bands 425, or any combination thereof, in an SBFD slot 405.

In some cases, the SBFD frequency pattern may indicate frequency resources of an uplink sub-band 425 and one or more downlink sub-bands 415, such as a downlink sub-band 415-*a* and a downlink sub-band 415-*b*, in the SBFD slot 405. In some other cases, the SBFD frequency pattern may indicate frequency resources of the uplink sub-band 425 and one or more guard bands 420, such as a guard band 420-*a* and a guard band 420-*b*, in the SBFD slot 405. In some other cases, the SBFD frequency pattern may indicate the uplink sub-band 425 (e.g., only the uplink sub-band 425), such that remaining resources (e.g., resource blocks) within the SBFD slot 405 may be used for one or more guard bands 420 and one or more downlink sub-bands 415 (e.g., or uplink).

In such cases, the SBFD frequency pattern may indicate the frequency resources of the one or more downlink sub-bands 415, the one or more guard bands 420, the one or more sub-bands 425, or any combination thereof, in an SBFD slot 405. For example, in some cases, the SBFD frequency pattern may indicate a starting resource block (e.g., an index associated with the starting resource block) and a quantity of resource blocks associated with each sub-band (e.g., each of the one or more downlink sub-bands 415, the one or more guard bands 420, the one or more sub-bands 425, or any combination thereof). In some other cases, the SBFD frequency pattern may indicate the starting resource block (e.g., the index associated with the starting resource block) and an ending resource block (e.g., an index associated with the ending resource block) associated with each sub-band.

Additionally, or alternatively, the control message may indicate an index (e.g., pattern index) associated with an SBFD frequency pattern. That is, the network entity 105 may transmit an indication (e.g., via a control message) of multiple SBFD frequency patterns and an index associated with each SBFD frequency pattern of the multiple SBFD frequency pattern. As such, the network entity 105 may transmit a control message indicating an index associated with an SBFD frequency pattern from the multiple SBFD frequency patterns. In some cases, a first index may be associated with a default SBFD frequency pattern.

Figure 5:
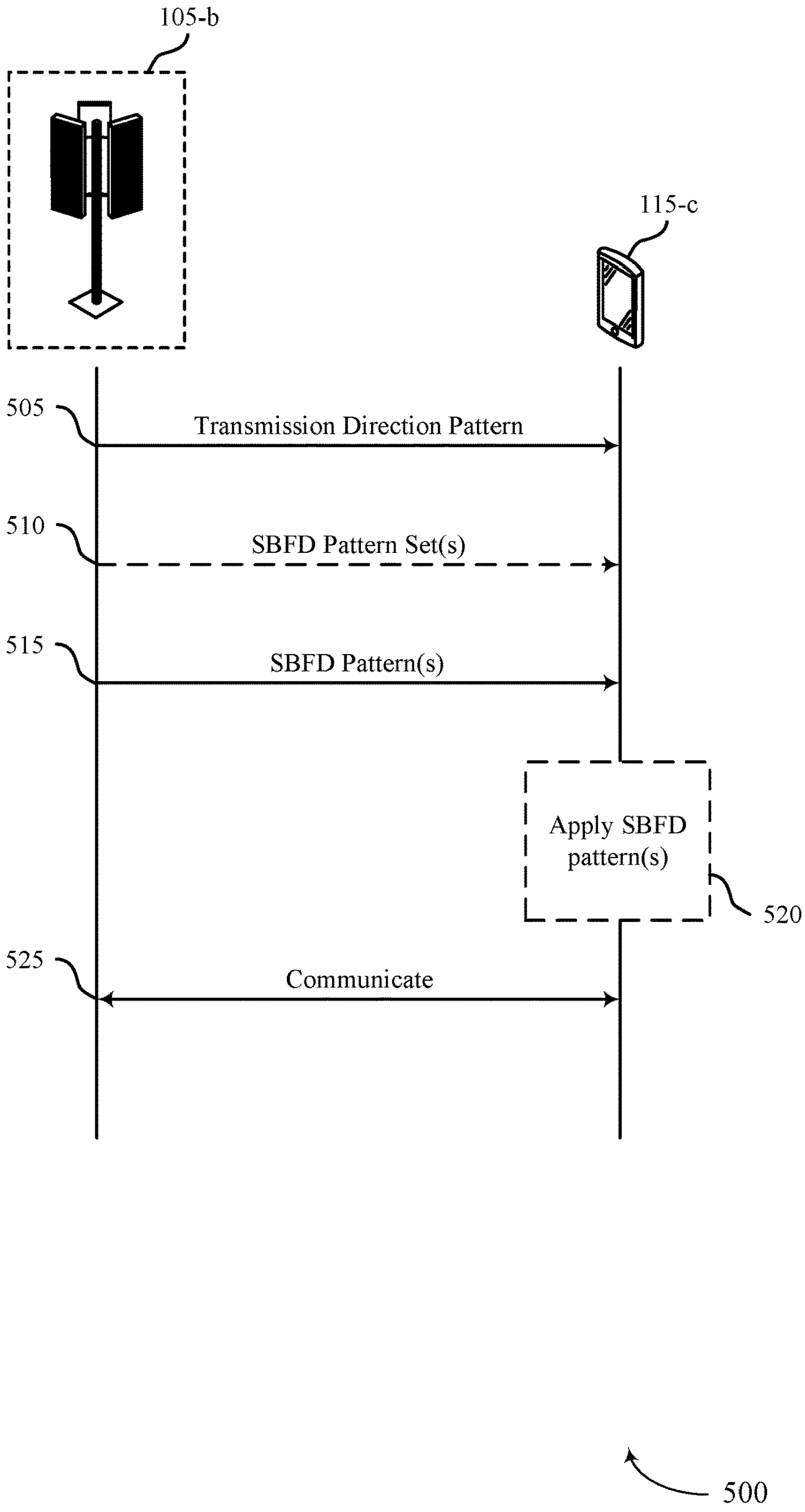
FIG. 5 shows an example of a process flow that supports techniques for indicating time and frequency locations of SBFD sub-bands in accordance with one or more aspects of the present disclosure.

FIG. 5 shows an example of a process flow 500 that supports techniques for indicating time and frequency locations of SBFD sub-bands in accordance with one or more aspects of the present disclosure. In some examples, the process flow 500 may implement or be implemented by aspects of the wireless communications system 100, the wireless communications system 200, the SBFD window pattern 300, the SBFD frequency pattern, or any combination thereof. For example, the process flow 500 may include one or more network entities 105 (e.g., a network entity 105-*b*) and one or more UEs 115 (e.g., a UE 115-*c*), which may be examples of the corresponding devices described herein with reference to FIG. 1.

At 505, the network entity 105-*b* may transmit, to the UE 115-*c*, first configuration information that indicates a transmission direction pattern for multiple transmission time intervals (e.g., multiple slots, multiple mini-slots, multiple symbols), wherein the transmission direction pattern defines, for the multiple transmission time intervals, one or more downlink transmission time intervals, one or more flexible transmission time intervals, or combinations thereof.

In some cases, at 510, the network entity 105-*b* may transmit, to the UE 115-*c*, an indication of one or more SBFD pattern sets, where each SBFD pattern set includes multiple SBFD patterns. For example, the one or more SBFD pattern sets may include an SBFD slot pattern set including multiple SBFD slot patterns, where each SBFD slot pattern is associated with a respective index. Additionally, or alternatively, the one or more SBFD pattern sets may include an SBFD window pattern set including multiple SBFD window patterns, where each SBFD window pattern is associated with a respective index. Additionally, or alternatively, the one or more SBFD pattern sets may include an SBFD frequency pattern set including multiple SBFD frequency patterns, where each SBFD frequency pattern is associated with a respective index.

At 515, the network entity 105-*b* may transmit (e.g., broadcast, unicast, or multicast), to the UE 115-*c*, second control information (e.g., via an RRC message, a DCI message, or a MAC-CE message) that indicates one or more SBFD patterns (e.g., from the multiple SBFD patterns), where the one or more SBFD patterns includes one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof. In some cases, the one or more SBFD patterns may be cell common or UE-specific (e.g., UE dedicated).

In some cases, the one or more SBFD patterns may include one or more SBFD slot patterns, where each SBFD slot pattern indicates whether each symbol within an SBFD slot is an SBFD symbol or a non-SBFD symbol. For example, each SBFD slot pattern may include a bitmap indicating a "0" for a non-SBFD symbol in an SBFD slot and a "1" for an SBFD symbol in an SBFD slot.

Additionally, or alternatively, the one or more SBFD patterns may include an SBFD window pattern. In some cases, the SBFD window pattern may indicate a bitmap defining the window duration, the bitmap indicating whether each symbol or slots within the window duration is an SBFD symbol or an SBFD slot. In some other cases, the SBFD window pattern may indicate a first index associated with a first symbol or first slot of the window duration, a second index associated with a last symbol or last slot of the window duration, a quantity of symbols or slots in the window duration, or any combination thereof.

Additionally, or alternatively, the one or more SBFD patterns may include an SBFD frequency pattern, where the SBFD frequency pattern indicate one or more uplink sub-bands, one or more downlink sub-bands, one or more guard bands, or any combination thereof, for SBFD slots. In such cases, the second control information may indicate one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof. Additionally, or alternatively, the second control information may indicate an index associated with the SBFD frequency pattern (e.g., from the SBFD frequency pattern set). In some examples, the indicated SBFD frequency pattern may be a default SBFD frequency pattern.

In some cases, at 520, the UE 115-*c* may apply the one or more indicated SBFD patterns to at least a subset of the multiple transmission time intervals. In some cases, the one or more SBFD patterns may be applied (e.g., may be for) a single CC or multiple CCs. For example, the one or more indicated SBFD patterns may include an SBFD slot pattern, such that the UE 115-*c* applies the SBFD slot pattern to each transmission time interval of the one or more downlink transmission time intervals, the one or more flexible transmission time intervals, or the combinations thereof. Alternatively, the one or more indicated SBFD patterns may include an SBFD slot pattern, such that the UE 115-*c* applies the SBFD slot pattern to a subset of the multiple transmission time intervals. In such cases, the subset of the transmission time intervals may be defined by a first transmission time interval, a duration (e.g., length), a last transmission time interval, or any combination thereof. Additionally, the first transmission time interval (e.g., a first index associated with the first transmission time interval), the duration, the last transmission time interval (e.g., a second index associated with the second transmission time interval), or any combination thereof, may be indicated via the second control information. In some cases, the first transmission time interval may be a first downlink transmission time interval of the one or more downlink transmission time intervals.

In some cases, the one or more indicated SBFD patterns may include a first SBFD slot pattern (e.g., the SBFD slot pattern set) and a second SBFD slot pattern (e.g., the SBFD slot pattern set). In such cases, the UE 115-*c* may apply the first SBFD slot pattern to a first transmission time interval of the multiple transmission time intervals based on the second control information indicating a first index associated with the first SBFD slot pattern and may apply the second SBFD slot pattern to a second transmission time interval of the multiple transmission time intervals based on the second control information indicating a second index associated with the second SBFD slot pattern.

At 525, the UE 115-*c* may communicate with the network entity 105-*b* based on application of the one or more SBFD slot patterns to the at least subset of the multiple transmission time intervals. For example, for each SBFD symbol or SBFD slot, the UE 115-*c* may communicate with the network entity 105-*b* via either one or more allocated uplink sub-bands or one or more allocated downlink sub-bands.

Figure 6:
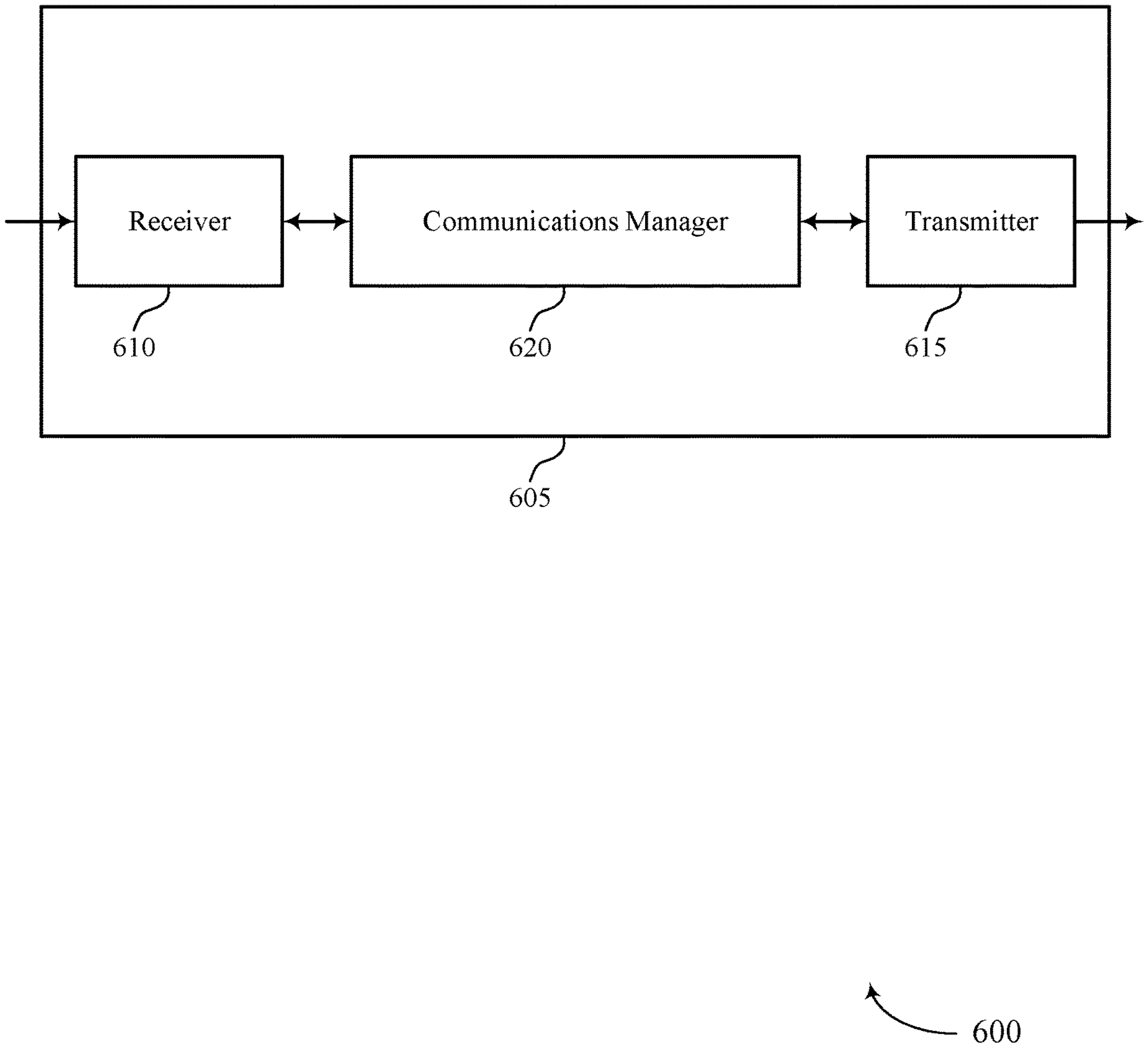
FIGS. 6 and 7 show block diagrams of devices that support techniques for indicating time and frequency locations of SBFD sub-bands in accordance with one or more aspects of the present disclosure.

FIG. 6 shows a block diagram 600 of a device 605 that supports techniques for indicating time and frequency locations of SBFD sub-bands in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating time and frequency locations of SBFD sub-bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating time and frequency locations of SBFD sub-bands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for indicating time and frequency locations of SBFD sub-bands as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The communications manager 620 is capable of, configured to, or operable to support a means for receiving second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE. The communications manager 620 is capable of, configured to, or operable to support a means for communicating with a network entity based on application of one of the one or more SBFD patterns to at least a subset of the set of multiple transmission time intervals.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for indicating time and frequency locations of SBFD sub-bands which may result in reduced processing, reduced power consumption, and more efficient utilization of communication resources, among other advantages.

Figure 7:
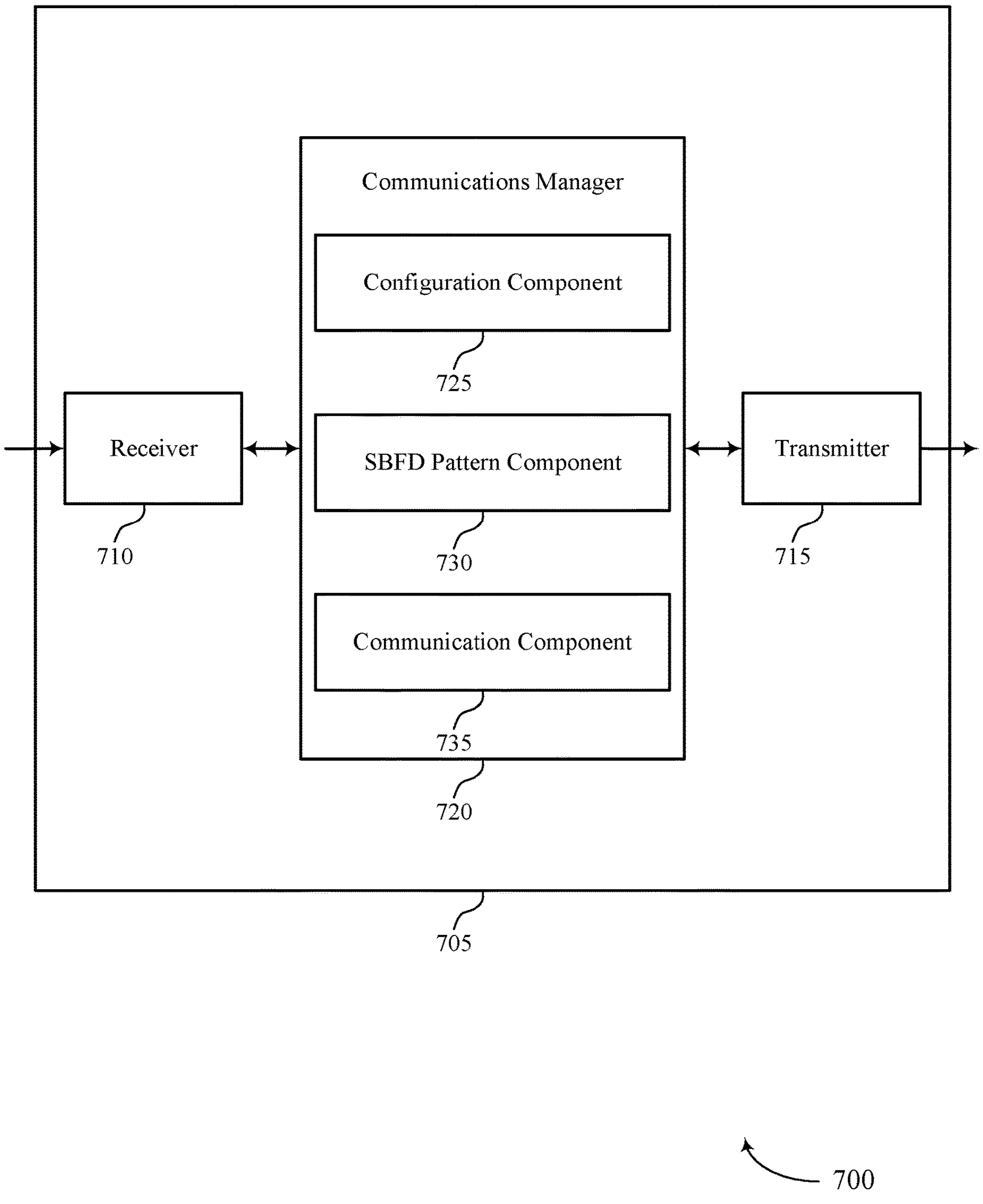

FIG. 7 shows a block diagram 700 of a device 705 that supports techniques for indicating time and frequency locations of SBFD sub-bands in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for indicating time and frequency locations of SBFD sub-bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for indicating time and frequency locations of SBFD sub-bands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for indicating time and frequency locations of SBFD sub-bands as described herein. For example, the communications manager 720 may include a configuration component 725, an SBFD pattern component 730, a communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The configuration component 725 is capable of, configured to, or operable to support a means for receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The SBFD pattern component 730 is capable of, configured to, or operable to support a means for receiving second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE. The communication component 735 is capable of, configured to, or operable to support a means for communicating with a network entity based on application of one of the one or more SBFD patterns to at least a subset of the set of multiple transmission time intervals.

Figure 8:
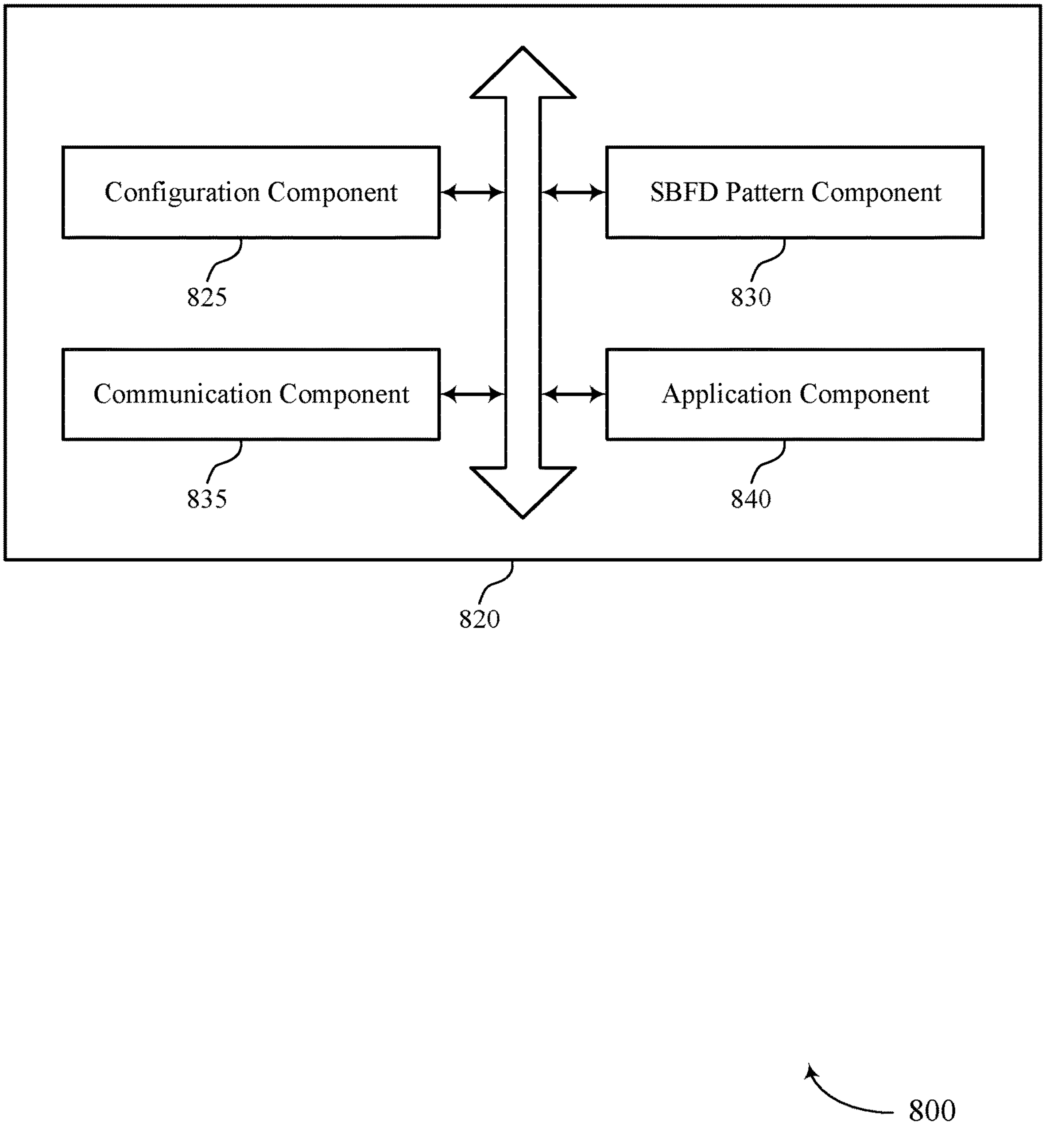
FIG. 8 shows a block diagram of a communications manager that supports techniques for indicating time and frequency locations of SBFD sub-bands in accordance with one or more aspects of the present disclosure.

FIG. 8 shows a block diagram 800 of a communications manager 820 that supports techniques for indicating time and frequency locations of SBFD sub-bands in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for indicating time and frequency locations of SBFD sub-bands as described herein. For example, the communications manager 820 may include a configuration component 825, an SBFD pattern component 830, a communication component 835, an application component 840, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The configuration component 825 is capable of, configured to, or operable to support a means for receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The SBFD pattern component 830 is capable of, configured to, or operable to support a means for receiving second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE. The communication component 835 is capable of, configured to, or operable to support a means for communicating with a network entity based on application of one of the one or more SBFD patterns to at least a subset of the set of multiple transmission time intervals.

In some examples, the one or more SBFD patterns includes an SBFD slot pattern, and the application component 840 is capable of, configured to, or operable to support a means for applying the SBFD slot pattern to each transmission time interval of the one or more downlink transmission time intervals, the one or more flexible transmission time intervals, or the combinations thereof, where each transmission time interval is a slot or a mini-slot.

In some examples, the one or more SBFD patterns includes the SBFD slot pattern, and the application component 840 is capable of, configured to, or operable to support a means for applying the SBFD slot pattern to the subset of the set of multiple transmission time intervals, where the subset is defined by a first transmission time interval, a duration, a last transmission time interval, or any combination thereof, where each transmission time interval of the subset is a slot or a mini-slot.

In some examples, the second control information includes a first index associated with the first transmission time interval, an indication of the duration, a second index associated with the last transmission time interval, or any combination thereof.

In some examples, the first transmission time interval is a first downlink transmission time interval of the one or more downlink transmission time intervals.

In some examples, each of the one or more SBFD slot patterns indicates whether each symbol within the slot is an SBFD symbol or a non-SBFD symbol.

In some examples, the configuration component 825 is capable of, configured to, or operable to support a means for receiving an indication of a set of multiple SBFD slot patterns, each SBFD slot pattern of the set of multiple SBFD slot patterns associated with an index.

In some examples, the one or more SBFD slot patterns includes a first SBFD slot pattern of the set of multiple SBFD slot patterns and a second SBFD slot pattern of the set of multiple SBFD slot patterns, and the application component 840 is capable of, configured to, or operable to support a means for applying the first SBFD slot pattern to a first transmission time interval of the set of multiple transmission time intervals based on the second control information indicating a first index associated with the first SBFD slot pattern. In some examples, the one or more SBFD slot patterns includes a first SBFD slot pattern of the set of multiple SBFD slot patterns and a second SBFD slot pattern of the set of multiple SBFD slot patterns, and the application component 840 is capable of, configured to, or operable to support a means for applying the second SBFD slot pattern to a second transmission time interval of the set of multiple transmission time intervals based on the second control information indicating a second index associated with the second SBFD slot pattern.

In some examples, the SBFD window pattern indicates a bitmap defining the window duration, the bitmap indicating whether each symbol or slot within the window duration is an SBFD symbol or an SBFD slot.

In some examples, the SBFD window pattern indicates a first index associated with a first symbol or first slot of the window duration, a second index associated with a last symbol or last slot of the window duration, a quantity of symbols or slots in the window duration, or any combination thereof.

In some examples, the frequency resources indicate one or more uplink sub-bands, one or more downlink sub-bands, one or more guard bands, or any combination thereof.

In some examples, the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

In some examples, the one or more SBFD patterns includes the SBFD frequency pattern, and the configuration component 825 is capable of, configured to, or operable to support a means for receiving an indication of a set of multiple SBFD frequency patterns including at least the SBFD frequency pattern, where each SBFD frequency pattern of the SBFD frequency patterns indicates frequency resources associated with SBFD slots and is associated with a respective index.

In some examples, the second control information includes an index associated with the SBFD frequency pattern.

In some examples, the SBFD frequency pattern is a default SBFD frequency pattern.

In some examples, the frequency resources indicate one or more uplink sub-bands and one or more downlink sub-bands.

In some examples, the frequency resources indicate one or more uplink sub-bands and one or more guard bands.

In some examples, the frequency resources indicate one or more uplink sub-bands.

In some examples, the one or more SBFD patterns are cell-common or UE-specific.

In some examples, the second control information is received via broadcast, multicast, or unicast.

In some examples, the second control information is received via a radio resource control message, a downlink control information message, a medium access control-control element message, or any combination thereof.

In some examples, the one or more SBFD patterns are associated with one or more component carriers.

Figure 9:
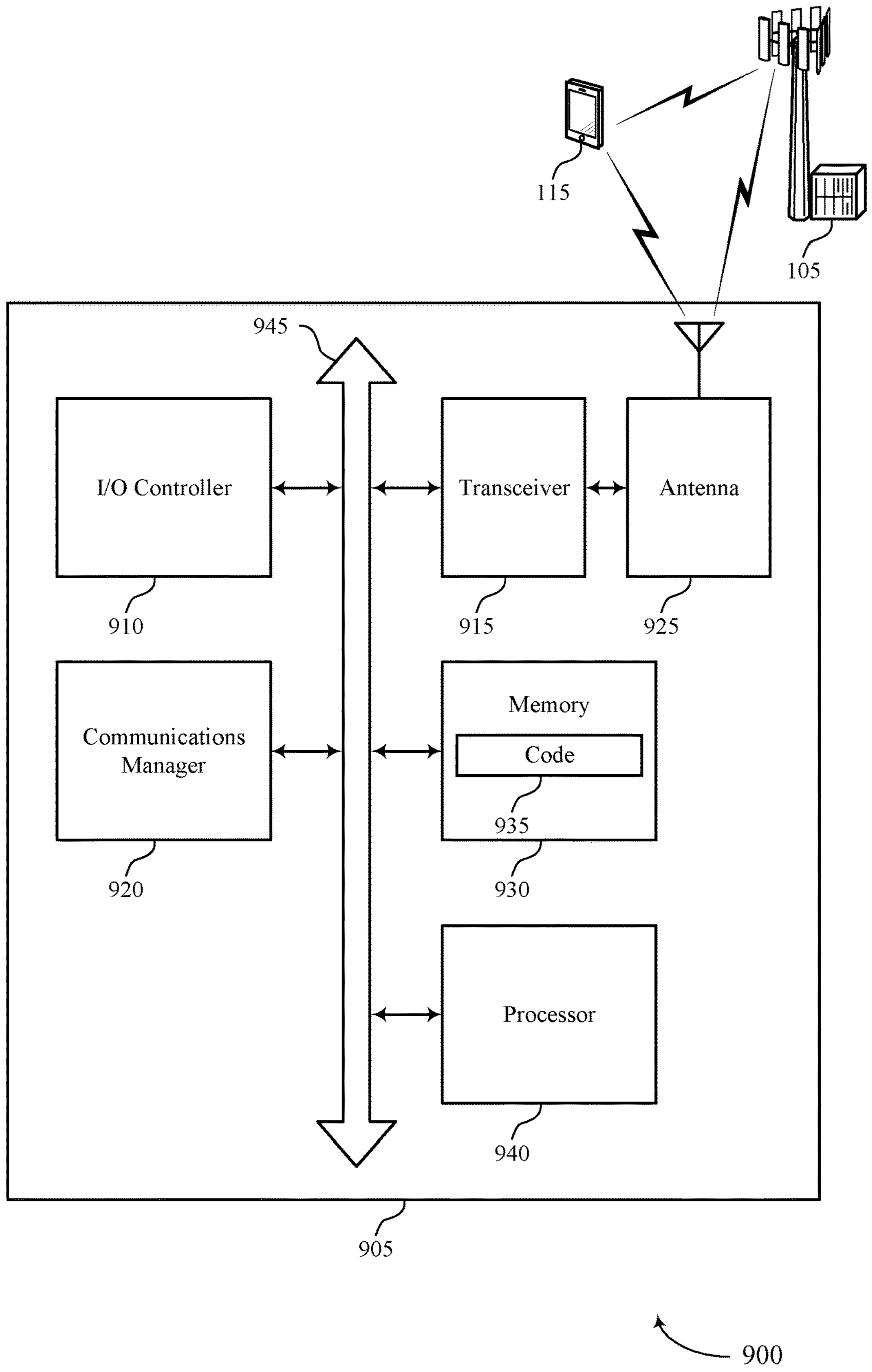
FIG. 9 shows a diagram of a system including a device that supports techniques for indicating time and frequency locations of SBFD sub-bands in accordance with one or more aspects of the present disclosure.

FIG. 9 shows a diagram of a system 900 including a device 905 that supports techniques for indicating time and frequency locations of SBFD sub-bands in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for indicating time and frequency locations of SBFD sub-bands). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The communications manager 920 is capable of, configured to, or operable to support a means for receiving second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE. The communications manager 920 is capable of, configured to, or operable to support a means for communicating with a network entity based on application of one of the one or more SBFD patterns to at least a subset of the set of multiple transmission time intervals.

By including or configuring the communications manager 920 in accordance with examples as described herein, the device 905 may support techniques for indicating time and frequency locations of SBFD sub-bands which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for indicating time and frequency locations of SBFD sub-bands as described herein, or the at least one processor 940 and the at least one memory 930 may be otherwise configured to, individually or collectively, perform or support such operations.

Figure 10:
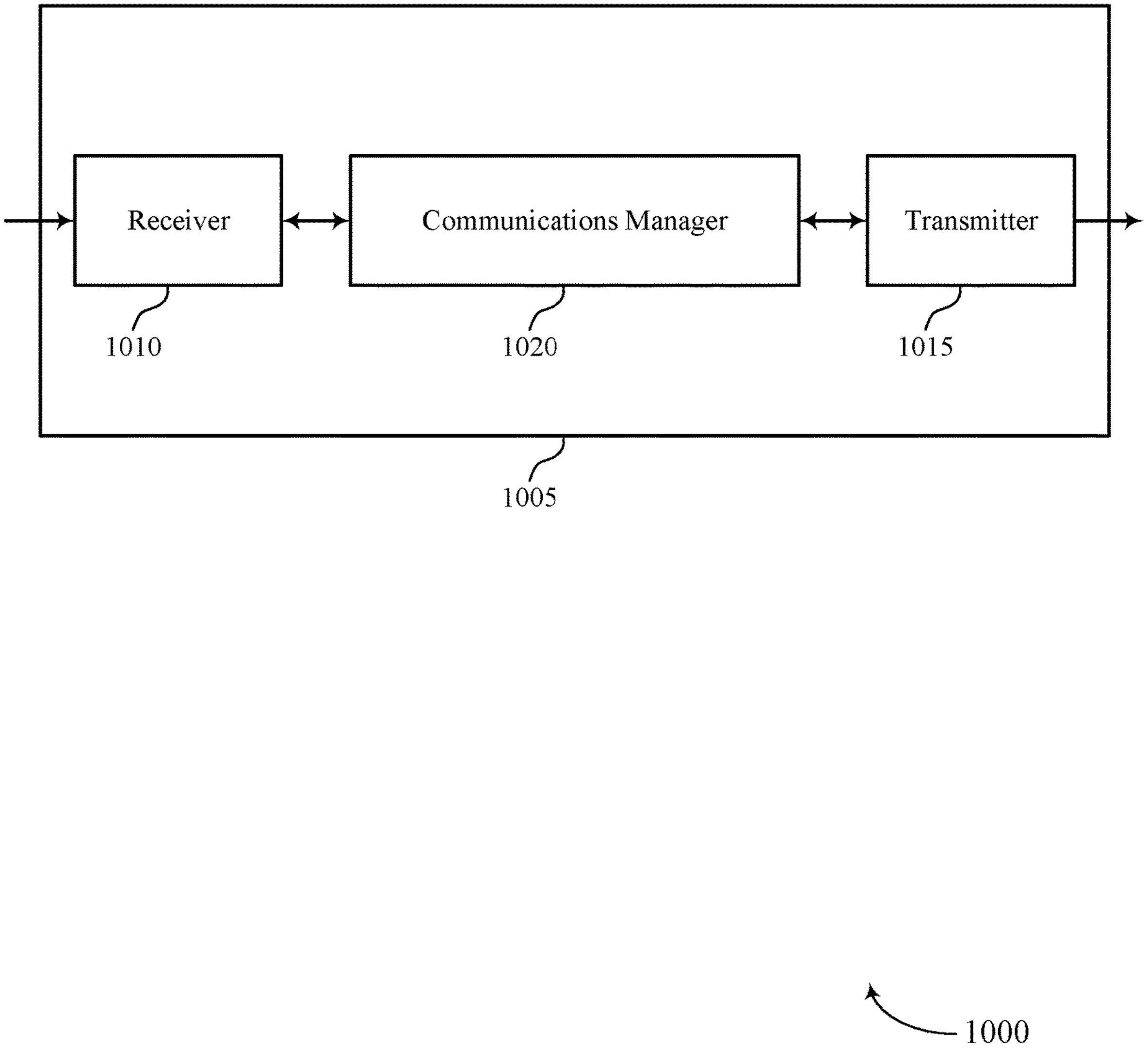
FIGS. 10 and 11 show block diagrams of devices that support techniques for indicating time and frequency locations of SBFD sub-bands in accordance with one or more aspects of the present disclosure.

FIG. 10 shows a block diagram 1000 of a device 1005 that supports techniques for indicating time and frequency locations of SBFD sub-bands in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for indicating time and frequency locations of SBFD sub-bands as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The communications manager 1020 is capable of, configured to, or operable to support a means for transmitting second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE. The communications manager 1020 is capable of, configured to, or operable to support a means for communicating with the first UE and the second UE based on at least one of the one or more SBFD patterns to at least a subset of the set of multiple transmission time intervals.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for indicating time and frequency locations of SBFD sub-bands which may result in reduced processing, reduced power consumption, and more efficient utilization of communication resources, among other advantages.

Figure 11:
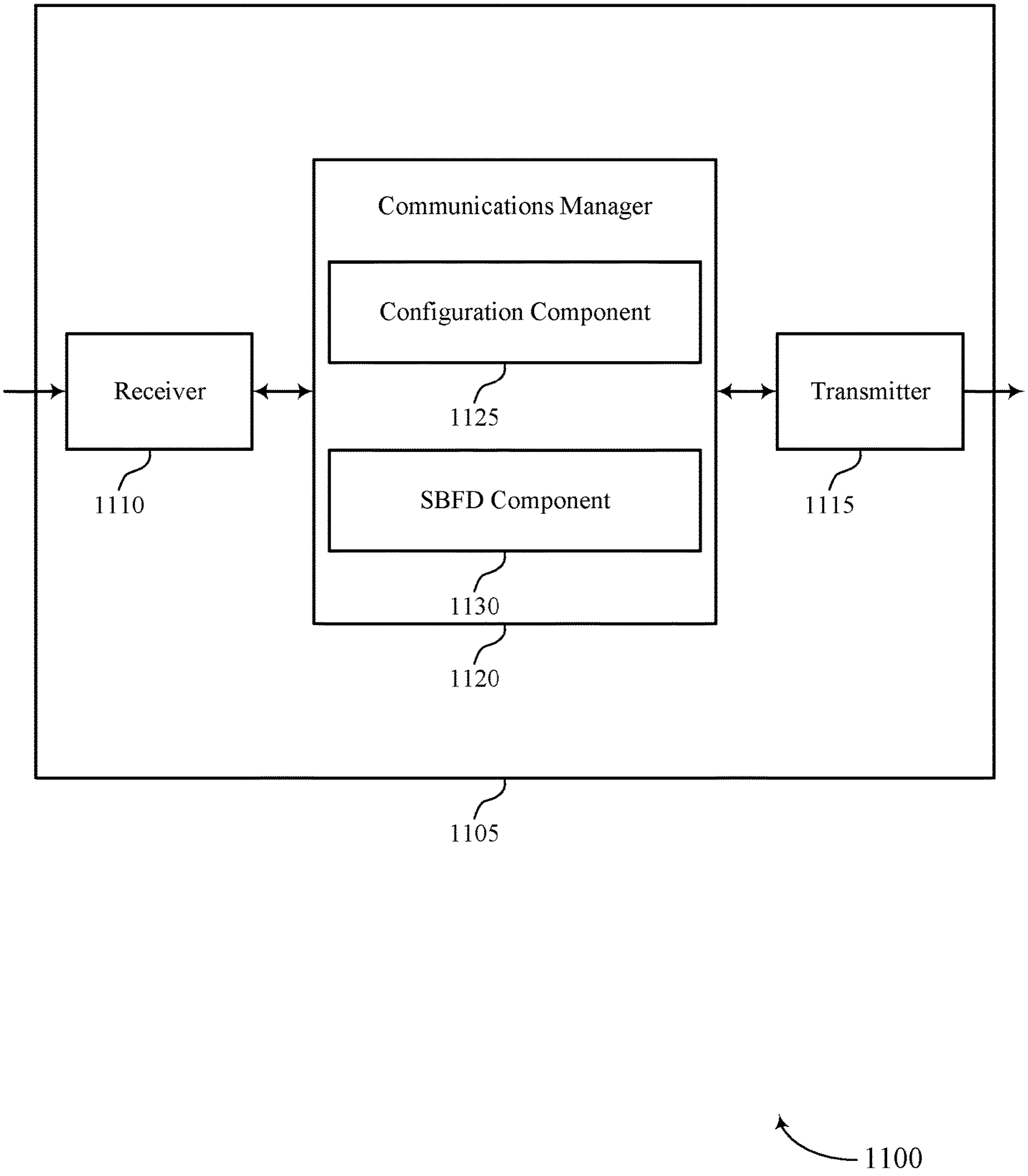

FIG. 11 shows a block diagram 1100 of a device 1105 that supports techniques for indicating time and frequency locations of SBFD sub-bands in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for indicating time and frequency locations of SBFD sub-bands as described herein. For example, the communications manager 1120 may include a configuration component 1125 an SBFD component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The configuration component 1125 is capable of, configured to, or operable to support a means for transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The configuration component 1125 is capable of, configured to, or operable to support a means for transmitting second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE. The SBFD component 1130 is capable of, configured to, or operable to support a means for communicating with the first UE and the second UE based on at least one of the one or more SBFD patterns to at least a subset of the set of multiple transmission time intervals.

Figure 12:
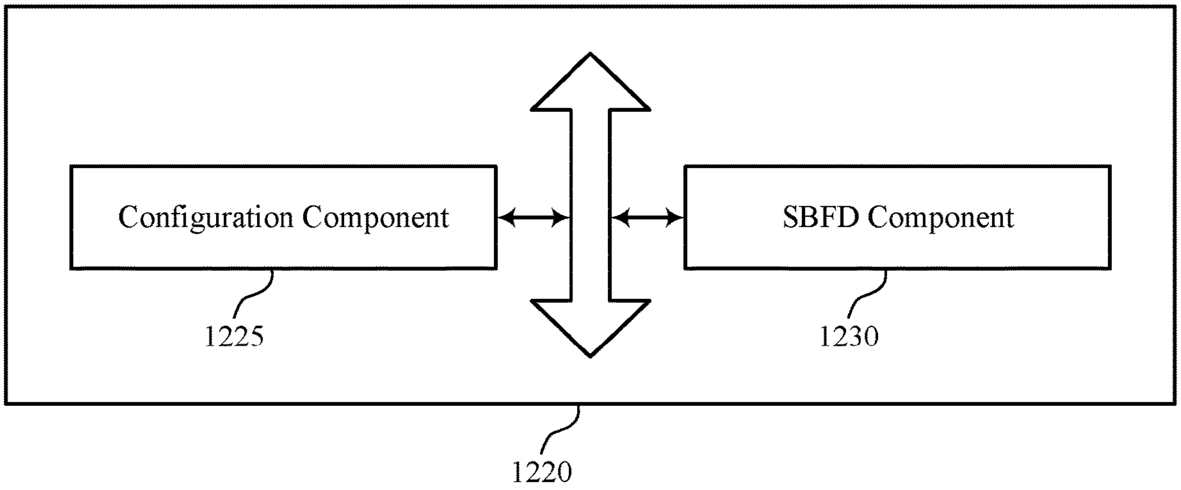
FIG. 12 shows a block diagram of a communications manager that supports techniques for indicating time and frequency locations of SBFD sub-bands in accordance with one or more aspects of the present disclosure.

FIG. 12 shows a block diagram 1200 of a communications manager 1220 that supports techniques for indicating time and frequency locations of SBFD sub-bands in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for indicating time and frequency locations of SBFD sub-bands as described herein. For example, the communications manager 1220 may include a configuration component 1225 an SBFD component 1230, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The configuration component 1225 is capable of, configured to, or operable to support a means for transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. In some examples, the configuration component 1225 is capable of, configured to, or operable to support a means for transmitting second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE. The SBFD component 1230 is capable of, configured to, or operable to support a means for communicating with the first UE and the second UE based on at least one of the one or more SBFD patterns to at least a subset of the set of multiple transmission time intervals.

In some examples, the one or more SBFD patterns includes an SBFD slot pattern. In some examples, the SBFD slot pattern is applied to each transmission time interval of the one or more downlink transmission time intervals, the one or more flexible transmission time intervals, or the combinations thereof. In some examples, each transmission time interval is a slot or a mini-slot.

In some examples, the one or more SBFD patterns includes the SBFD slot pattern. In some examples, the SBFD slot pattern is applied to the subset of the set of multiple transmission time intervals. In some examples, the subset is defined by a first transmission time interval, a duration, a last transmission time interval, or any combination thereof. In some examples, each transmission time interval of the subset is a slot or a mini-slot.

In some examples, the second control information includes a first index associated with the first transmission time interval, an indication of the duration, a second index associated with the last transmission time interval, or any combination thereof.

In some examples, the first transmission time interval is a first downlink transmission time interval of the one or more downlink transmission time intervals.

In some examples, each of the one or more SBFD slot patterns indicates whether each symbol within the slot is an SBFD symbol or a non-SBFD symbol.

In some examples, the configuration component 1225 is capable of, configured to, or operable to support a means for transmitting an indication of a set of multiple SBFD slot patterns, each SBFD slot pattern of the set of multiple SBFD slot patterns associated with an index.

In some examples, the one or more SBFD slot patterns includes a first SBFD slot pattern of the set of multiple SBFD slot patterns and a second SBFD slot pattern of the set of multiple SBFD slot patterns, the first SBFD slot pattern is applied to a first transmission time interval of the set of multiple transmission time intervals based on the second control information indicating a first index associated with the first SBFD slot pattern. In some examples, the second SBFD slot pattern is applied to a second transmission time interval of the set of multiple transmission time intervals based on the second control information indicating a second index associated with the second SBFD slot pattern.

In some examples, the SBFD window pattern indicates a bitmap defining the window duration, the bitmap indicating whether each symbol or slot within the window duration is an SBFD symbol or an SBFD slot.

In some examples, the SBFD window pattern indicates a first index associated with a first symbol or first slot of the window duration, a second index associated with a last symbol or last slot of the window duration, a quantity of symbols or slots in the window duration, or any combination thereof.

In some examples, the frequency resources indicate one or more uplink sub-bands, one or more downlink sub-bands, one or more guard bands, or any combination thereof.

In some examples, the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

In some examples, the one or more SBFD patterns includes the SBFD frequency pattern, and the configuration component 1225 is capable of, configured to, or operable to support a means for transmitting an indication of a set of multiple SBFD frequency patterns including at least the SBFD frequency pattern, where each SBFD frequency pattern of the SBFD frequency patterns indicates frequency resources associated with SBFD slots and is associated with a respective index.

In some examples, the second control information includes an index associated with the SBFD frequency pattern.

In some examples, the SBFD frequency pattern is a default SBFD frequency pattern.

In some examples, the frequency resources indicate one or more uplink sub-bands and one or more downlink sub-bands.

In some examples, the frequency resources indicate one or more uplink sub-bands and one or more guard bands.

In some examples, the frequency resources indicate one or more uplink sub-bands.

In some examples, the one or more SBFD patterns are cell-common or UE-specific.

In some examples, the second control information is broadcast, multicast, or unicast.

In some examples, the second control information is transmitted via a radio resource control message, a downlink control information message, a medium access control-control element message, or any combination thereof.

In some examples, the one or more SBFD patterns are associated with one or more component carriers.

Figure 13:
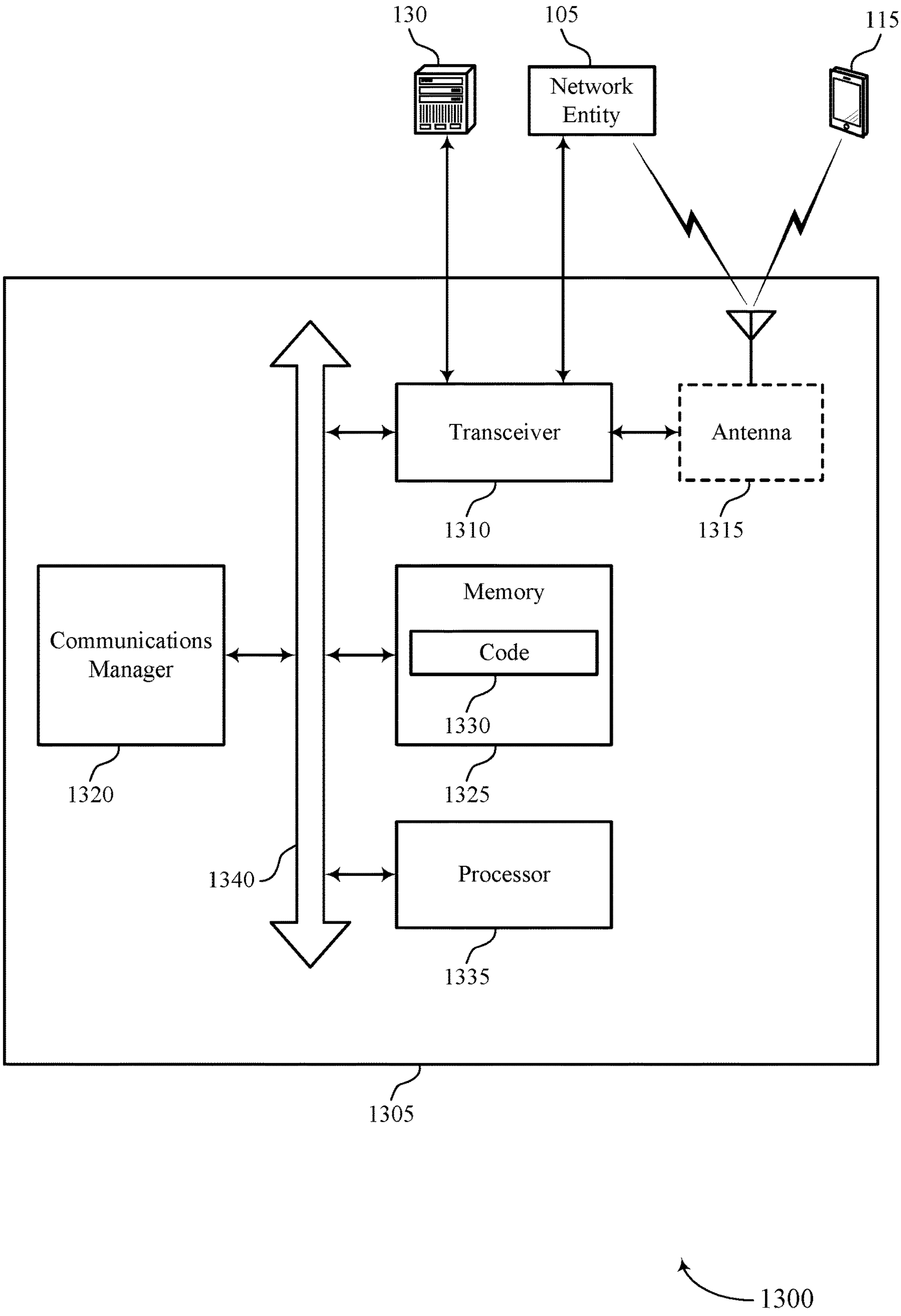
FIG. 13 shows a diagram of a system including a device that supports techniques for indicating time and frequency locations of SBFD sub-bands in accordance with one or more aspects of the present disclosure.

FIG. 13 shows a diagram of a system 1300 including a device 1305 that supports techniques for indicating time and frequency locations of SBFD sub-bands in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for indicating time and frequency locations of SBFD sub-bands). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The communications manager 1320 is capable of, configured to, or operable to support a means for transmitting second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE. The communications manager 1320 is capable of, configured to, or operable to support a means for communicating with the first UE and the second UE based on at least one of the one or more SBFD patterns to at least a subset of the set of multiple transmission time intervals.

By including or configuring the communications manager 1320 in accordance with examples as described herein, the device 1305 may support techniques for indicating time and frequency locations of SBFD sub-bands which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for indicating time and frequency locations of SBFD sub-bands as described herein, or the at least one processor 1335 and the at least one memory 1325 may be otherwise configured to, individually or collectively, perform or support such operations.

FIG. 14 shows a flowchart illustrating a method 1400 that supports techniques for indicating time and frequency locations of SBFD sub-bands in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The operations of block 1405 may be performed in accordance with examples as disclosed herein. In some examples, aspects of the operations of 1405 may be performed by a configuration component 825 as described with reference to FIG. 8.

At 1410, the method may include receiving second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands or one or more downlink sub-bands to the first UE. The operations of block 1410 may be performed in accordance with examples as disclosed herein. In some examples, aspects of the operations of 1410 may be performed by an SBFD pattern component 830 as described with reference to FIG. 8.

At 1415, the method may include communicating with a network entity based on application of one of the one or more SBFD patterns to at least a subset of the set of multiple transmission time intervals. The operations of block 1415 may be performed in accordance with examples as disclosed herein. In some examples, aspects of the operations of 1415 may be performed by a communication component 835 as described with reference to FIG. 8.

Figure 15:
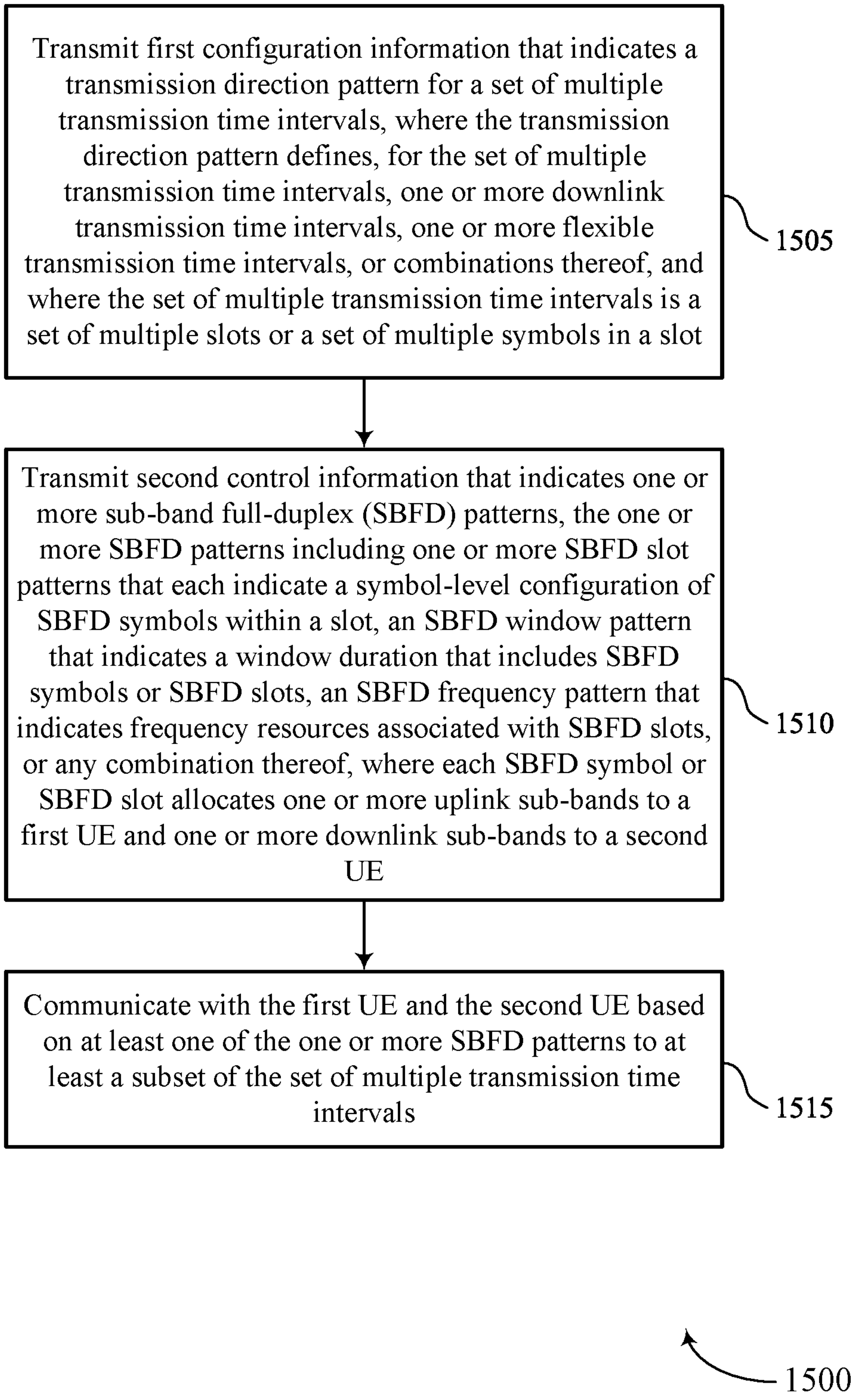

FIG. 15 shows a flowchart illustrating a method 1500 that supports techniques for indicating time and frequency locations of SBFD sub-bands in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting first configuration information that indicates a transmission direction pattern for a set of multiple transmission time intervals, where the transmission direction pattern defines, for the set of multiple transmission time intervals, one or more downlink transmission time intervals, one or more flexible transmission time intervals, or combinations thereof, and where the set of multiple transmission time intervals is a set of multiple slots or a set of multiple symbols in a slot. The operations of block 1505 may be performed in accordance with examples as disclosed herein. In some examples, aspects of the operations of 1505 may be performed by a configuration component 1225 as described with reference to FIG. 12.

At 1510, the method may include transmitting second control information that indicates one or more SBFD (SBFD) patterns, the one or more SBFD patterns including one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, where each SBFD symbol or SBFD slot allocates one or more uplink sub-bands to a first UE and one or more downlink sub-bands to a second UE. The operations of block 1510 may be performed in accordance with examples as disclosed herein. In some examples, aspects of the operations of 1510 may be performed by a configuration component 1225 as described with reference to FIG. 12.

At 1515, the method may include communicating with the first UE and the second UE based on at least one of the one or more SBFD patterns to at least a subset of the set of multiple transmission time intervals. The operations of block 1515 may be performed in accordance with examples as disclosed herein. In some examples, aspects of the operations of 1515 may be performed by an SBFD component 1230 as described with reference to FIG. 12.

The following provides an overview of aspects of the present disclosure:

Aspect 1: A method for wireless communications at a UE, comprising: receiving first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot; receiving second control information that indicates one or more SBFD patterns, the one or more SBFD patterns comprising one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands or one or more downlink sub-bands to the first UE; and communicating with a network entity based at least in part on application of one of the one or more SBFD patterns to at least a subset of the plurality of transmission time intervals.

Aspect 2: The method of aspect 1, wherein the one or more SBFD patterns comprises an SBFD slot pattern, the method further comprising: applying the SBFD slot pattern to each transmission time interval of the one or more downlink transmission time intervals, the one or more flexible transmission time intervals, or the combinations thereof, wherein each transmission time interval is a slot or a mini-slot.

Aspect 3: The method of any of aspects 1 through 2, wherein the one or more SBFD patterns comprises the SBFD slot pattern, the method further comprising: applying the SBFD slot pattern to the subset of the plurality of transmission time intervals, wherein the subset is defined by a first transmission time interval, a duration, a last transmission time interval, or any combination thereof, wherein each transmission time interval of the subset is a slot or a mini-slot.

Aspect 4: The method of aspect 3, wherein the second control information comprises a first index associated with the first transmission time interval, an indication of the duration, a second index associated with the last transmission time interval, or any combination thereof.

Aspect 5: The method of any of aspects 3 through 4, wherein the first transmission time interval is a first downlink transmission time interval of the one or more downlink transmission time intervals.

Aspect 6: The method of any of aspects 1 through 5, wherein each of the one or more SBFD slot patterns indicates whether each symbol within the slot is an SBFD symbol or a non-SBFD symbol.

Aspect 7: The method of any of aspects 1 through 6, further comprising: receiving an indication of a plurality of SBFD slot patterns, each SBFD slot pattern of the plurality of SBFD slot patterns associated with an index.

Aspect 8: The method of aspect 7, wherein the one or more SBFD slot patterns comprises a first SBFD slot pattern of the plurality of SBFD slot patterns and a second SBFD slot pattern of the plurality of SBFD slot patterns, the method further comprising: applying the first SBFD slot pattern to a first transmission time interval of the plurality of transmission time intervals based at least in part on the second control information indicating a first index associated with the first SBFD slot pattern; and applying the second SBFD slot pattern to a second transmission time interval of the plurality of transmission time intervals based at least in part on the second control information indicating a second index associated with the second SBFD slot pattern.

Aspect 9: The method of any of aspects 1 through 8, wherein the SBFD window pattern indicates a bitmap defining the window duration, the bitmap indicating whether each symbol or slot within the window duration is an SBFD symbol or an SBFD slot.

Aspect 10: The method of any of aspects 1 through 9, wherein the SBFD window pattern indicates a first index associated with a first symbol or first slot of the window duration, a second index associated with a last symbol or last slot of the window duration, a quantity of symbols or slots in the window duration, or any combination thereof.

Aspect 11: The method of any of aspects 1 through 10, wherein the frequency resources indicate one or more uplink sub-bands, one or more downlink sub-bands, one or more guard bands, or any combination thereof.

Aspect 12: The method of aspect 11, wherein the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

Aspect 13: The method of any of aspects 11 through 12, wherein the one or more SBFD patterns comprises the SBFD frequency pattern, the method further comprising: receiving an indication of a plurality of SBFD frequency patterns including at least the SBFD frequency pattern, wherein each SBFD frequency pattern of the SBFD frequency patterns indicates frequency resources associated with SBFD slots and is associated with a respective index.

Aspect 14: The method of aspect 13, wherein the second control information comprises an index associated with the SBFD frequency pattern.

Aspect 15: The method of aspect 14, wherein the SBFD frequency pattern is a default SBFD frequency pattern.

Aspect 16: The method of any of aspects 1 through 15, wherein the frequency resources indicate one or more uplink sub-bands and one or more downlink sub-bands.

Aspect 17: The method of any of aspects 1 through 16, wherein the frequency resources indicate one or more uplink sub-bands and one or more guard bands.

Aspect 18: The method of any of aspects 1 through 17, wherein the frequency resources indicate one or more uplink sub-bands.

Aspect 19: The method of any of aspects 1 through 18, wherein the one or more SBFD patterns are cell-common or UE-specific.

Aspect 20: The method of any of aspects 1 through 19, wherein the second control information is received via broadcast, multicast, or unicast.

Aspect 21: The method of any of aspects 1 through 20, wherein the second control information is received via a RRC message, a DCI message, a MAC-CE message, or any combination thereof.

Aspect 22: The method of any of aspects 1 through 21, wherein the one or more SBFD patterns are associated with one or more CCs.

Aspect 23: A method for wireless communications at a network entity, comprising: transmitting first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot; transmitting second control information that indicates one or more SBFD patterns, the one or more SBFD patterns comprising one or more SBFD slot patterns that each indicate a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands to a first UE and one or more downlink sub-bands to a second UE; and communicating with the first UE and the second UE based at least in part on at least one of the one or more SBFD patterns to at least a subset of the plurality of transmission time intervals.

Aspect 24: The method of aspect 23, wherein the one or more SBFD patterns comprises an SBFD slot pattern, and the SBFD slot pattern is applied to each transmission time interval of the one or more downlink transmission time intervals, the one or more flexible transmission time intervals, or the combinations thereof, each transmission time interval is a slot or a mini-slot.

Aspect 25: The method of any of aspects 23 through 24, wherein the one or more SBFD patterns comprises the SBFD slot pattern, the SBFD slot pattern is applied to the subset of the plurality of transmission time intervals, and the subset is defined by a first transmission time interval, a duration, a last transmission time interval, or any combination thereof, each transmission time interval of the subset is a slot or a mini-slot.

Aspect 26: The method of aspect 25, wherein the second control information comprises a first index associated with the first transmission time interval, an indication of the duration, a second index associated with the last transmission time interval, or any combination thereof.

Aspect 27: The method of any of aspects 25 through 26, wherein the first transmission time interval is a first downlink transmission time interval of the one or more downlink transmission time intervals.

Aspect 28: The method of any of aspects 23 through 27, wherein each of the one or more SBFD slot patterns indicates whether each symbol within the slot is an SBFD symbol or a non-SBFD symbol.

Aspect 29: The method of any of aspects 23 through 28, further comprising: transmitting an indication of a plurality of SBFD slot patterns, each SBFD slot pattern of the plurality of SBFD slot patterns associated with an index.

Aspect 30: The method of aspect 29, wherein the one or more SBFD slot patterns comprises a first SBFD slot pattern of the plurality of SBFD slot patterns and a second SBFD slot pattern of the plurality of SBFD slot patterns, the first SBFD slot pattern is applied to a first transmission time interval of the plurality of transmission time intervals based at least in part on the second control information indicating a first index associated with the first SBFD slot pattern, and the second SBFD slot pattern is applied to a second transmission time interval of the plurality of transmission time intervals based at least in part on the second control information indicating a second index associated with the second SBFD slot pattern.

Aspect 31: The method of any of aspects 23 through 30, wherein the SBFD window pattern indicates a bitmap defining the window duration, the bitmap indicating whether each symbol or slot within the window duration is an SBFD symbol or an SBFD slot.

Aspect 32: The method of any of aspects 23 through 31, wherein the SBFD window pattern indicates a first index associated with a first symbol or first slot of the window duration, a second index associated with a last symbol or last slot of the window duration, a quantity of symbols or slots in the window duration, or any combination thereof.

Aspect 33: The method of any of aspects 23 through 32, wherein the frequency resources indicate one or more uplink sub-bands, one or more downlink sub-bands, one or more guard bands, or any combination thereof.

Aspect 34: The method of aspect 33, wherein the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

Aspect 35: The method of any of aspects 33 through 34, wherein the one or more SBFD patterns comprises the SBFD frequency pattern, the method further comprising: transmitting an indication of a plurality of SBFD frequency patterns including at least the SBFD frequency pattern, wherein each SBFD frequency pattern of the SBFD frequency patterns indicates frequency resources associated with SBFD slots and is associated with a respective index.

Aspect 36: The method of aspect 35, wherein the second control information comprises an index associated with the SBFD frequency pattern.

Aspect 37: The method of aspect 36, wherein the SBFD frequency pattern is a default SBFD frequency pattern.

Aspect 38: The method of any of aspects 23 through 37, wherein the frequency resources indicate one or more uplink sub-bands and one or more downlink sub-bands.

Aspect 39: The method of any of aspects 23 through 38, wherein the frequency resources indicate one or more uplink sub-bands and one or more guard bands.

Aspect 40: The method of any of aspects 23 through 39, wherein the frequency resources indicate one or more uplink sub-bands.

Aspect 41: The method of any of aspects 23 through 40, wherein the one or more SBFD patterns are cell-common or UE-specific.

Aspect 42: The method of any of aspects 23 through 41, wherein the second control information is broadcast, multicast, or unicast.

Aspect 43: The method of any of aspects 23 through 42, wherein the second control information is transmitted via a RRC message, a DCI message, a MAC-CE message, or any combination thereof.

Aspect 44: The method of any of aspects 23 through 43, wherein the one or more SBFD patterns are associated with one or more CCs.

Aspect 45: A UE for wireless communications, comprising one or more memories storing processor-executable code, and one or more processors coupled with the one or more memories and individually or collectively operable to execute the code to cause the UE to perform a method of any of aspects 1 through 22.

Aspect 46: A UE for wireless communications, comprising at least one means for performing a method of any of aspects 1 through 22.

Aspect 47: A non-transitory computer-readable medium storing code for wireless communications, the code comprising instructions executable by one or more processors to perform a method of any of aspects 1 through 22.

Aspect 48: A network entity for wireless communications, comprising one or more memories storing processor-executable code, and one or more processors coupled with the one or more memories and individually or collectively operable to execute the code to cause the network entity to perform a method of any of aspects 23 through 44.

Aspect 49: A network entity for wireless communications, comprising at least one means for performing a method of any of aspects 23 through 44.

Aspect 50: A non-transitory computer-readable medium storing code for wireless communications, the code comprising instructions executable by one or more processors to perform a method of any of aspects 23 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot;

receive an indication of a plurality of sub-band full duplex (SBFD) patterns, each SBFD pattern of the plurality of SBFD patterns associated with an index, wherein the plurality of SBFD patterns comprise one or more SBFD slot patterns that each indicates a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands or one or more downlink sub-bands to the UE;

receive second control information that indicates, for each transmission time interval of at least a subset of the plurality of transmission time intervals, a respective index of an SBFD pattern from the plurality of SBFD patterns; and communicate with a network entity based at least in part on application of a corresponding SBFD pattern to each transmission time interval of the at least subset of the plurality of transmission time intervals in accordance with the second control information.

2. The UE of claim 1, wherein the second control information indicates a same index of a first SBFD pattern from the plurality of SBFD patterns to be applied to all transmission time intervals in the at least subset of the plurality of transmission time intervals, wherein the first SBFD pattern is a first SBFD slot pattern, and the one or more processors are individually or collectively further operable to execute the code to cause the UE to:

apply the first SBFD slot pattern to each transmission time interval of the one or more downlink transmission time intervals, the one or more flexible transmission time intervals, or the combinations thereof, wherein each transmission time interval is a slot or a mini-slot.

3. The UE of claim 1, wherein the second control information indicates a same index of a first SBFD pattern from the plurality of SBFD patterns to be applied to all transmission time intervals in the at least subset of the plurality of transmission time intervals, wherein the first SBFD pattern is a first SBFD slot pattern, and the one or more processors are individually or collectively further operable to execute the code to cause the UE to:

apply the first SBFD slot pattern to the subset of the plurality of transmission time intervals, wherein the subset is defined by a first transmission time interval, a duration, a last transmission time interval, or any combination thereof, wherein each transmission time interval of the subset is a slot or a mini-slot.

4. The UE of claim 3, wherein the second control information comprises a first index associated with the first transmission time interval, an indication of the duration, a second index associated with the last transmission time interval, or any combination thereof.

5. The UE of claim 3, wherein the first transmission time interval is a first downlink transmission time interval of the one or more downlink transmission time intervals.

6. The UE of claim 1, wherein each SBFD slot patterns indicated by the second control information indicates whether each symbol within the slot is an SBFD symbol or a non-SBFD symbol.

7. The UE of claim 1, wherein the plurality of SBFD patterns comprises a first SBFD slot pattern and a second SBFD slot pattern, and the one or more processors are individually or collectively further operable to execute the code to cause the UE to:

apply the first SBFD slot pattern to a first transmission time interval of the plurality of transmission time intervals based at least in part on the second control information indicating a first index associated with the first SBFD slot pattern for the first transmission time interval; and apply the second SBFD slot pattern to a second transmission time interval of the plurality of transmission time intervals based at least in part on the second control information indicating a second index associated with the second SBFD slot pattern for the second transmission time interval.

8. The UE of claim 1, wherein the SBFD window pattern indicates a bitmap defining the window duration, the bitmap indicating whether each symbol or slot within the window duration is an SBFD symbol or an SBFD slot.

9. The UE of claim 1, wherein the SBFD window pattern indicates a first resource index associated with a first symbol or first slot of the window duration, a second resource index associated with a last symbol or last slot of the window duration, a quantity of symbols or slots in the window duration, or any combination thereof.

10. The UE of claim 1, wherein the frequency resources indicate the one or more uplink sub-bands, the one or more downlink sub-bands, one or more guard bands, or any combination thereof.

11. The UE of claim 10, wherein the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

12. The UE of claim 10, wherein the SBFD frequency pattern is a default SBFD frequency pattern.

13. The UE of claim 1, wherein the frequency resources indicate the one or more uplink sub-bands and the one or more downlink sub-bands.

14. The UE of claim 1, wherein the frequency resources indicate the one or more uplink sub-bands and one or more guard bands.

15. The UE of claim 1, wherein the frequency resources indicate the one or more uplink sub-bands.

16. A network entity, comprising:

one or more memories storing processor-executable code; and one or more processors coupled with the one or more memories and individually or collectively operable to execute the code to cause the network entity to:

transmit first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot;

transmit an indication of a plurality of sub-band full duplex (SBFD) patterns, each SBFD pattern of the plurality of SBFD patterns associated with an index, wherein the plurality of SBFD patterns comprise one or more SBFD slot patterns that each indicates a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands to a first user equipment (UE) and one or more downlink sub-bands to a second UE;

transmit second control information that indicates, for each transmission time interval of at least a subset of the plurality of transmission time intervals, a respective index of an SBFD pattern from the plurality of SBFD patterns; and communicate with the first UE and the second UE based at least in part on a corresponding SBFD pattern for each transmission time interval of the at least subset of the plurality of transmission time intervals.

17. The network entity of claim 16, wherein the second control information indicates a same index of a first SBFD pattern from the plurality of SBFD patterns to be applied to all transmission time intervals in the at least subset of the plurality of transmission time intervals, wherein the first SBFD pattern is a first SBFD slot pattern, wherein the first SBFD slot pattern is applied to each transmission time interval of the one or more downlink transmission time intervals, the one or more flexible transmission time intervals, or the combinations thereof, and wherein each transmission time interval is a slot or a mini-slot.

18. The network entity of claim 16, wherein the second control information indicates a same index of a first SBFD pattern from the plurality of SBFD patterns to be applied to all transmission time intervals in the at least subset of the plurality of transmission time intervals, wherein the first SBFD pattern is a first SBFD slot pattern, wherein the first SBFD slot pattern is applied to the subset of the plurality of transmission time intervals, wherein the subset is defined by a first transmission time interval, a duration, a last transmission time interval, or any combination thereof, and wherein each transmission time interval of the subset is a slot or a mini-slot.

19. The network entity of claim 18, wherein the second control information comprises a first index associated with the first transmission time interval, an indication of the duration, a second index associated with the last transmission time interval, or any combination thereof.

20. The network entity of claim 16, wherein the SBFD window pattern indicates a bitmap defining the window duration, the bitmap indicating whether each symbol or slot within the window duration is an SBFD symbol or an SBFD slot.

21. The network entity of claim 16, wherein the SBFD window pattern indicates a first index associated with a first symbol or first slot of the window duration, a second index associated with a last symbol or last slot of the window duration, a quantity of symbols or slots in the window duration, or any combination thereof.

22. The network entity of claim 16, wherein the frequency resources indicate the one or more uplink sub-bands, the one or more downlink sub-bands, one or more guard bands, or any combination thereof.

23. The network entity of claim 22, wherein the second control information indicates one or more first resource block indices indicating a respective start of each downlink sub-band, uplink sub-band, or guard band, one or more second resource block indices indicating a respective end of each sub-band or guard band, a quantity of resource blocks in each sub-band or guard band, or any combination thereof.

24. A method for wireless communications at a user equipment (UE), comprising:

receiving first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot;

receiving an indication of a plurality of sub-band full duplex (SBFD) patterns, each SBFD pattern of the plurality of SBFD patterns associated with an index, wherein the plurality of SBFD patterns comprise one or more SBFD slot patterns that each indicates a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands or one or more downlink sub-bands to the UE;

receiving second control information that indicates, for each transmission time interval of at least a subset of the plurality of transmission time intervals, a respective index of an SBFD pattern from the plurality of SBFD patterns; and communicating with a network entity based at least in part on application of a corresponding SBFD pattern to each transmission time interval of the at least subset of the plurality of transmission time intervals in accordance with the second control information.

25. A method for wireless communications at a network entity, comprising:

transmitting first configuration information that indicates a transmission direction pattern for a plurality of transmission time intervals, wherein the transmission direction pattern defines, for the plurality of transmission time intervals, one or more downlink transmission time intervals, one or more flexible transmission time intervals, or combinations thereof, and wherein the plurality of transmission time intervals is a plurality of slots or a plurality of symbols in a slot;

transmitting an indication of a plurality of sub-band full duplex (SBFD) patterns, each SBFD pattern of the plurality of SBFD patterns associated with an index, wherein the plurality of SBFD patterns comprise one or more SBFD slot patterns that each indicates a symbol-level configuration of SBFD symbols within a slot, an SBFD window pattern that indicates a window duration that includes SBFD symbols or SBFD slots, an SBFD frequency pattern that indicates frequency resources associated with SBFD slots, or any combination thereof, wherein each SBFD symbol or SBFD slot allocates one or more uplink sub-bands to a first user equipment (UE) and one or more downlink sub-bands to a second UE;

transmitting second control information that indicates, for each transmission time interval of at least a subset of the plurality of transmission time intervals, a respective index of an SBFD pattern from the plurality of SBFD patterns; and communicating with the first UE and the second UE based at least in part on a corresponding SBFD pattern for each transmission time interval of the at least subset of the plurality of transmission time intervals.

* * * * *